United States Patent [19]
Pellegrino et al.

[11] Patent Number: 6,149,441
[45] Date of Patent: Nov. 21, 2000

[54] COMPUTER-BASED EDUCATIONAL SYSTEM

[75] Inventors: Joseph E. Pellegrino, Westerly, R.I.; Francis J. Cinami, Canterbury, Conn.; Stephen P. Pacheco, Westerly, R.I.; Roberta J. Scroggins, Ledyard; Cynthia L. Miller, Salem, both of Conn.

[73] Assignee: Technology for Connecticut, Inc., New London, Conn.

[21] Appl. No.: 09/186,679

[22] Filed: Nov. 6, 1998

[51] Int. Cl.[7] ..................................... G09B 3/00
[52] U.S. Cl. .................... 434/350; 434/118; 434/362; 707/102; 706/927
[58] Field of Search ............................ 434/118, 236–238, 434/247, 307 R, 322, 323, 335, 350, 359, 362, 365; 382/164, 191, 318; 706/927; 705/1, 10; 707/517, 530, 100–104; 704/2–10

[56] References Cited

U.S. PATENT DOCUMENTS

| | | |
|---|---|---|
| 3,405,457 | 10/1968 | Bitzer . |
| 4,636,174 | 1/1987 | Andersen et al. . |
| 4,759,717 | 7/1988 | Larochelle et al. . |
| 4,793,813 | 12/1988 | Bitzer et al. . |
| 4,820,167 | 4/1989 | Nobles et al. . |
| 4,907,146 | 3/1990 | Caporali . |
| 5,002,491 | 3/1991 | Abrahamson et al. . |
| 5,010,495 | 4/1991 | Willetts .............................. 364/920.1 |
| 5,204,813 | 4/1993 | Samph et al. ........................... 434/362 |
| 5,295,836 | 3/1994 | Ryu et al. ............................... 434/335 |
| 5,310,349 | 5/1994 | Daniels et al. . |
| 5,318,450 | 6/1994 | Carver . |
| 5,385,475 | 1/1995 | Sudman et al. ..................... 434/307 R |
| 5,437,555 | 8/1995 | Ziv-El . |
| 5,441,415 | 8/1995 | Lee et al. . |
| 5,458,494 | 10/1995 | Krohn et al. . |
| 5,565,316 | 10/1996 | Kershaw et al. ......................... 434/322 |
| 5,690,496 | 11/1997 | Kennedy .............................. 434/307 R |
| 5,692,906 | 12/1997 | Corder ................................... 434/156 |
| 5,727,950 | 3/1998 | Cook et al. ............................. 434/350 |
| 5,823,788 | 10/1998 | Lemelson et al. ...................... 434/350 |
| 5,829,983 | 11/1998 | Koyama et al. ........................ 434/118 |
| 5,893,717 | 4/1999 | Kirsch et al. ........................... 434/118 |
| 5,907,831 | 5/1999 | Lotvin et al. ............................. 705/14 |
| 5,957,699 | 9/1999 | Peterson et al. ........................ 434/350 |
| 5,978,648 | 11/1999 | George et al. .......................... 434/362 |
| 5,991,595 | 11/1999 | Romano et al. ........................ 434/353 |
| 6,002,915 | 12/1999 | Shimizu ................................. 434/350 |
| 6,024,577 | 2/2000 | Wadahama et al. .................... 434/322 |
| 6,039,575 | 3/2000 | L'Allier et al. ......................... 434/323 |
| 6,064,856 | 5/2000 | Lee et al. ................................ 434/350 |

*Primary Examiner*—Joe H. Cheng
*Attorney, Agent, or Firm*—Cummings & Lockwood

[57] ABSTRACT

A computer-based educational system for use by teacher and student users and including a server computer and at least one client computer having a display and user input device is disclosed. A lesson builder allows teachers to create customized lessons incorporating lesson material that includes text, audio, images, video and application programs into a lesson for delivery to the student user. Lesson material can be drawn from a variety of sources, including a lesson material data base, a database of existing lessons, and the Internet. Teachers can add interesting lesson material to the lesson material database for use by other teachers. Lesson material can be presented in a lesson directly or as a link, such that the student is presented with the material at the student's option. Students may access the Internet during execution of the lesson, and may collaborate with other students as well as the teacher. The system is typically accessed by teachers and students via Internet browser applications receiving web pages served from the server computer, which communicates with the client computer via an intranet or the Internet. The functionality of the system of the present invention can be realized using standard commercially available hardware and software.

36 Claims, 26 Drawing Sheets

FIG. 11

- 260
- 252
- 244 248 246
- 250
- 269
- Search Media Catalog Using:
- Media Tag [Hyperlink ▼]
- [Tutorial] [Hints]
- Use Keywords: [Match Any ▼]
- [Add Catalog Entry]
- [Search Local Media]
- 254
- Use Description (Enter phrase or sub-phrase)
- [Browse Web]
- Specify items to search on and then press Search [Search] [Reset]
- 242
- 258
- 263
- Page 1 of 10

| | Media Catalog Search Results (48 Matches Found) | | | |
|---|---|---|---|---|
| Tag | Reference Description | Keywords | | |
| HyperLink | http//..... Mystic Seaport's Amistad web site | Amistad history slavery | Modify | Delete |
| HyperLink | http//..... Microsoft Encarta Lesson Collection | LESSONS ENCARTA MECROSOFT | Modify | Delete |
| HyperLink | http//..... Amazon rainforest educational site | rainforest amazon | Modify | Delete |
| HyperLink | http//..... Earth and Moon Viewer | EDUCTION | Modify | Delete |

- 272
- 274  276
- Add Catalog Entry:
- Reference: [http//...!]
- 278 — Media Tag: [▼]
- Description:
- 280 — Keywords:
- Copyright Info:
- [Search] [Reset]
- 281
- 282
- 283

Search Lesson Catalog Using:
Subject [▼]          Grade Level [All ▼]   Hints
Lesson Title : [          ]
Teacher's Last Name [Teacher]   Keyword: [          ]
379 — New Lesson
                                                350
☐ Include Published Lessons
        Specify the items to search on then press "Search"  [Search] [Reset]
                                           348        351

Search Lesson Catalog Using:
Subject [History ▼]        Grade Level [All ▼]   Hints
Lesson Title : [          ]
Teacher's Last Name [          ]   Keyword: [          ]
New Lesson ☐ Include Published Lessons
        Specify the items to search on then press "Search"  [Search] [Reset]

| Lesson Catalog Search Results (3 Matches Flound) | | | | | |
|---|---|---|---|---|---|
| Subject | Title | Teacher | Grade | Show | |
| History | Amistad History and Hollywood | Mary L Jones | 9 to 12 | [Lesson Page] [Student Page] | [Select] |
| History | Civil War Overview | Mary L Jones | 8 to 12 | [Lesson Page] [Student Page] | [Select] |
| History | Famous Presidents | Mary L Jones | 7 to 12 | [Lesson Page] [Student Page] | [Select] |

| Lesson Title: Amistad: An Historicl Event | | Responsible Teacher: Name |
|---|---|---|
| Subject: History | Grade 11 to 12 | Keywords history Amistad slavery |
| Lesson Description This lesson explore the events of the 1839 Amistad encident Notes | | |

373 — Modity Lesson Plan | Modify Student Lesson | Show Plan Summary | Show Plan Details
Delete Lesson | Copy Lesson | Show Student Lesson 376   374   372

| Lesson Title: Amistad: History and Hollywood | | Responsible Teacher: Name |
|---|---|---|
| Subject: History | Grade 11 to 12 | Keywords history slavery |
| Lesson Description This lesson explore the events of the 1839 Amistad encident Notes >>Not Provded<< | | |

Lesson has been PUBLISHED and can not be modified | Show Lesson Page
Copy Lesson | Show Student Page

374

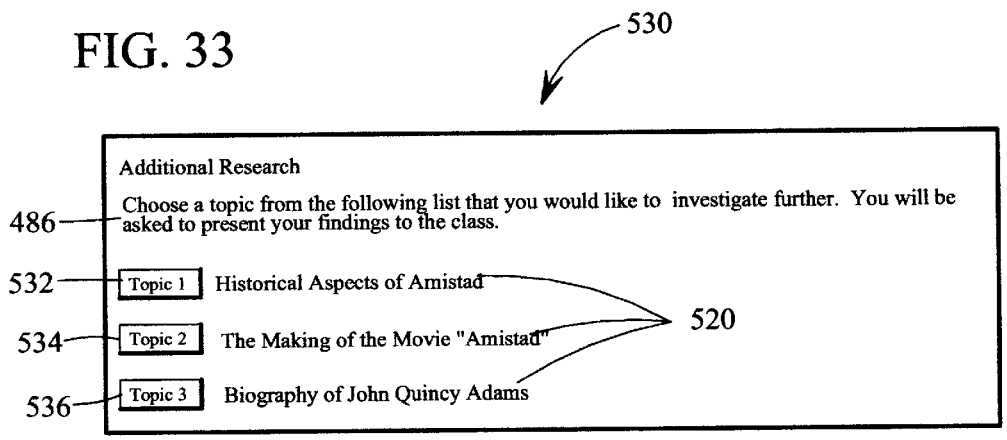

FIG. 35

Recorder Lesson Elements — 490, 492, 494, 502, 500

| Current Position | Type | Description | Select New Positions |
|---|---|---|---|
| 1 | | Cawdor Castle Picture | 1 ▼ |
| 2 | | Macbeth--History or Propaganda | 2 ▼ |
| 3 | | Shakespeare Timeline | 3 ▼ |
| 4 | | Timeline Question | 4 ▼ |
| 5 | | Holinshed's Chronicles | 5 ▼ |
| 6 | | Holeshed Question 1 | 6 ▼ |
| 7 | | Holeshed Question 2 | 7 ▼ |
| 8 | | Shakespeare Link | 8 ▼ |
| 9 | | Macbeth Site | 9 ▼ |

Hints

Select the desired positions and press the "Reorder" buton.   Recorder (504)  Done (506)

FIG. 36

| Control | Description |
|---|---|
| Add New Class | Allows the creation of a new "class" entry. This will be performed using a separate maintenance page. |
| Assign Access | Allows the creation of a new "class/student' entry to the database. |
| Summary | Provides for a search for a lesson to assign to a class/student. |
| Preview | Provices a summary of the selected lesson. |
| Select | Selects a desired lesson for assignment of class/student access. |
| Assign | Assigns class and/or student access to a selected lesson. |
| Reset | This will clear the form fields. |
| Save | This will save the modified or new information |
| Search | This will use the search parameters specified to locate the desired entries. Search results will be shown in the lower window. |
| Delete | Allows the deletion of the entry currently being displayed. |
| Modify | Thesearch results table will allow modification of individual entries to be initiated directly from the table. |
| Help | Provide the user with page specific help. This will also allow the user to access a more complete help and tutorial support capability. |
| Quit | This will terminate the user's activities and return to the Log-On page. |
| Info | This will display summary information from the "class/student" and "class/teacher" databases. |
| FAQ | Provides answers to frequently asked questions. |

FIG. 37

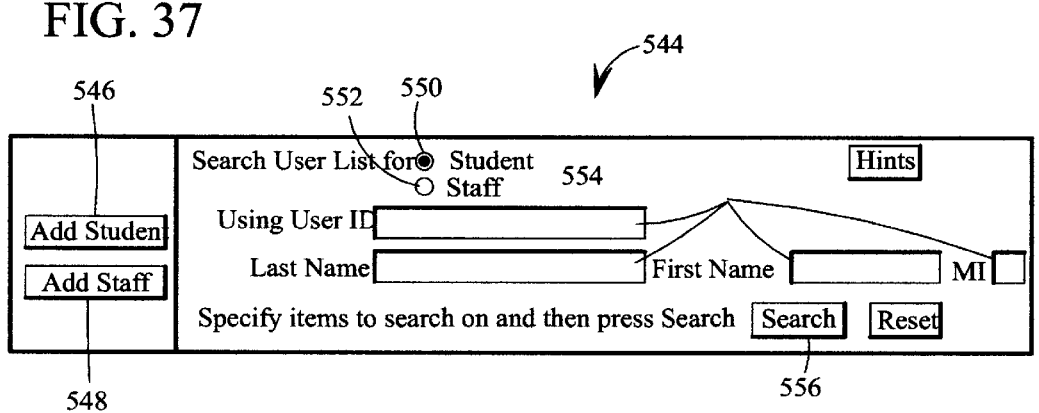

FIG. 38

| Operation | Description |
|---|---|
| Add Student | Allows the creation of a new "student" user entry (admin only). |
| Add Staff | Allows the creation of a new "staff" user entry (admin only). |
| Search | This will use the search parameters specified to locat the desired entries. Search results will be shown in the search window. |
| Reset | This will clear the values from all form fields. |
| Home | Returns to the Staff Home Page |
| Help | Provide the user with page specific help. This will also allow the user to access a more complete help and tutorial support capability. |
| Modify | Allows the deletion of the student (staff) user entry currently beig displated (admin only). |
| Delete | Will save the information currently displayed to the database. This supports both modification and "new" student operations. |
| Quit | This will terminate the user's activities and return to the Log-On page. |

COMPUTER-BASED EDUCATIONAL SYSTEM

BACKGROUND

Computer-based educational (CBE) systems are known in the art. One well known system is the PLATO system first developed at the University of Illinois. The PLATO system is a large, main frame central computer system that typically uses relatively "dumb" terminals that communicate over telephone lines with the mainframe computer. The PLATO system presents material as text or graphical matter, much akin to a textbook. The student user, via a keyboard, interacts with the system by indicating that he or she had digested the material being presented and is ready to view additional material. The student can also answer questions presented by the system. The PLATO system is described in U.S. Pat. No. 3,405,457.

CBE systems have made considerable progress since the advent of the PLATO system, as computers have become more powerful and communication between computers has become faster and more efficient. One recent system, disclosed in U.S. Pat. No. 5,318,450, focuses on providing an automated classroom that integrates a variety of sources of video instructional materials, such as TV, CATV, VCR, video disk players, closed circuit TV, and the like, with a source of computer-based instructional materials. Students can proceed at their own pace through lessons tailored to individual needs.

Another recent CBE system emphasizes interactive group communication, wherein a teacher can interact with students, and students with each other and the teacher. The teachers and student can be geographically separated, and students are typically located in a multiplicity of remote learning centers. Such a system is disclosed in U.S. Pat. No. 5,437,555.

Yet another CBE system disclosed in U.S. Pat. No. 5,458,494 includes hardware for interfacing with the public telephone network and for accepting incoming phone calls from students. Personal identification codes supplied by students connected over telephone lines allow access by the students to selected prerecorded lesson material. A record is generated for determining the use of the system by students.

Such systems are described as exemplary of known CBE systems, which tend to incorporate specialized hardware and to rely on traditional sources of material, such as prerecorded video cassettes of lessons and closed circuit TV, to address the drawbacks of traditional classroom teaching. Such drawbacks include the necessity of all students and the teacher being in the same location, the difficulty of individually pacing the learning process to each student, and the time consuming administrative duties imposed on teachers.

In recent years, the computational power of personal computers has increased dramatically, and prices have steadily fallen. communication between personal computers has also seen considerable improvement. Modem speeds have increased, and personal computers can be more easily networked, such as by the use of local area networks. Accordingly, some CBE systems tend to now be based, at least in part, on personal computers, and on the presentation of multimedia material, such as text, pictures, video and audio, via the personal computer.

For example, disclosed in U.S. Pat. No. 5,310,349 is a virtual school interface running on networked personal computers for providing administrative and instructional functions to users in a scholastic environment. A user selects among grouped functions by accessing one of a plurality of rooms in a school. The user can interact with other users, and a courseware scheduler delivers specific courseware to specific computers during selected time periods. A learning path editor allows users to author student curriculum sequences using graphical icons.

The above CBE systems address many of the drawbacks of the traditional classroom, wherein a teacher, largely unaided by technology, instructed only those students physically present, spent considerable time on administrative duties, and taught to the class as a whole, such that all students were forced to learn at the same pace.

However, known CBE systems described above have drawbacks. Such systems can require specialized software and hardware that tend to increase the cost of the CBE system. In addition, the above systems do not appreciate the importance of the Internet as a source of educational material, as a means of communication between students and teacher, and as means for reducing the cost and expense of the CBE system to a school. Furthermore, the synergistic aspect of a traditional school environment, where teachers can share insights and build upon the expertise, experience, and efforts of others, is not typically a salient feature of known CBE systems.

Accordingly, it is an object of the present invention to address one or more of the aforementioned disadvantages and deficiencies of the prior art. Other more specific objects will be apparent to one of ordinary skill in light of the disclosure herein.

SUMMARY OF THE INVENTION

The present invention addresses the foregoing deficiencies and drawbacks of the prior art by providing a computer-based educational system for use by teacher and student users. The system includes a server computer and at least one client computer including, respectively, server and client processors for executing server and client programs; server and client memory elements each including a random access memory element for storing, respectively, the server and client programs; and server and client input and output elements for communication between the server and client computers. At least one of the client and server computers includes at least one display for providing output to a user, and at least one user input means, including at least a keyboard and a pointing and selecting device.

The server computer further includes a lesson material database for storing lesson material, where lesson material includes one or more of text, image, video, audio, and application program files; a lesson database for storing lesson plans and associated student lesson pages, if any, which may include predetermined lesson material incorporated into existing lessons in a predetermined order; and a lesson builder for allowing a teacher user to interactively create a new lesson plan via the display and the input means.

The lesson builder includes provision for allowing the teacher user to search the lesson material database for the selected lesson material, and to retrieve the selected lesson material when found; to search the lesson database for the selected lesson material, and to retrieve the selected lesson material when found; and to incorporate the selected lesson material into the new lesson in a selected order with respect to other lesson material. The computer-based educational system further includes a lesson deliverer for interactively delivering the new lesson to a student user of the educational computer system via a display and user input means.

According to yet an additional feature of the present invention, a computer-based educational method is provided, and the method includes the step of providing a server computer and at least one client computer, including, respectively, server and client processors for executing server and client programs; server and client memory elements, each including a random access memory element for storing, respectively, the server and client programs; and server and client input and output elements for communication between the server and client computers.

The method further includes the step of providing a lesson material database for storing lesson material, wherein the lesson material includes one or more of text, image, video, audio, and application program files, and the step of providing a display for providing output to a user, and a user input means for user input, wherein the user input means includes at least a keyboard and a pointing and selecting device.

The method also includes the step of providing a lesson database for storing existing lessons, each of which includes predetermined lesson material incorporated into the existing lesson in a predetermined order; providing a lesson builder for allowing a teacher user to interactively create a new lesson, including selected lesson material, and to modify an existing lesson, wherein the lesson builder includes provision for allowing the teacher user to: (i) search the lesson material database for the selected lesson material, and retrieve the selected lesson material when found; (ii) search the lesson database for the selected lesson material and retrieve the selected lesson material when found; and (iii) incorporate the selected lesson material into the new lesson.

The method additionally includes the step of providing a lesson deliverer for delivering the new lesson to a student.

The computer-based educational system of the present invention thus advantageously allows a teacher user to create customized lessons incorporating lesson material including text, audio, images, video and application program files into a lesson, and delivers the lesson to selected students. In creating a lesson, the teacher can search the Internet, a lesson material database of useful lesson material, and existing lessons for lesson material to incorporate into the new lesson. Teachers can also copy and modify existing lessons. Lesson material can be added to and deleted from the lesson material database. The lesson material database can be implemented as a media catalog of references, including references to the Internet, and as a folder or folders for locally storing lesson material.

Students executing a lesson are presented with selected lesson material in a selected order determined by the teacher. Direct presentation of a selected lesson to the student may be made optional, that is, the student executing the lesson may be presented with a link to lesson material rather than directly with the material. The link can be to an Internet site, or to a particular image or text on the site. Students and teachers may access the Internet during delivery of a lesson.

Students may collaborate with each other and the teacher, and the lesson can include assignments, such as writing essays and the like, which involve application program files. The assignments can be submitted for review by the teacher.

The functionality of the computer-based educational system of the present invention can be advantageously realized using standard, commercially-available hardware and software applications programs to minimize custom programming, and to reduce the cost of the system to schools and other educational institutions or organizations. It is intended that one use of the present invention be in school districts, such as a metropolitan school system of a major city. However, the method and apparatus of the invention are equally applicable and useful to numerous other educational settings, institutions and organizations.

These and other features of the present invention are more fully set forth below.

BRIEF DESCRIPTION OF THE DRAWINGS

For a more complete understanding of the invention, reference is made to the following Detailed Description of the Preferred Embodiments, and the accompanying drawings, in which

FIG. 11 illustrates the Media Catalog Search Results Page presented upon completion of a search of the media catalog initiated from the Media Catalog Management Page of FIG. 10.

FIG. 12 shows the Add Catalog Entry Form for adding lesson material to the media catalog, and which can be accessed from the Media Catalog Management Page of FIG. 10.

FIG. 20 illustrates the Lesson Builder Form Page for allowing a teacher user to build a lesson for delivery to a student user, and which can be accessed from the Teacher Home Page shown in FIG. 9 upon clicking the "lesson builder" button of the Teacher Home Page.

FIG. 21 shows the results of a search of the lesson database of FIG. 1 and initiated from the Lesson Builder Form Page of FIG. 20.

FIG. 23A shows the page presented upon selecting the "Select" button associated with an "unpublished" lesson that may be listed in the search results list of FIG. 21.

FIG. 23B shows the page presented upon selecting the "Select" button associated with a "published" lesson that may be listed in the search results list of FIG. 21.

FIG. 33 shows an exemplary Navigation Element lesson constructed in accordance with the Navigation Element template page of FIG. 32.

FIG. 34 illustrates the a "Current Element List" created on the Student Lesson Development page of FIG. 28, and provided for listing the current lesson elements in a lesson, and allowing a user to modify, delete, change the type of, and preview each lesson element.

FIG. 35 illustrates the Reorder Lesson Elements Page for reordering the lesson elements of a lesson, and which can be accessed from the Lesson Development Page of FIG. 28.

FIG. 36 is a table summarizing the functional controls provided by the computer-based educational system of FIG. 1 for associating selected teacher, students and lessons for providing selected classes.

FIG. 37 illustrates the User Management Page for managing users of the computer-based educational system of FIG. 1 and which can be accessed from the Teacher Home Page shown in FIG. 9.

FIG. 38 is a table of functional controls accessed from the User Management Page of FIG. 37.

DETAILED DESCRIPTION OF PREFERRED A EMBODIMENT

Figure 1:
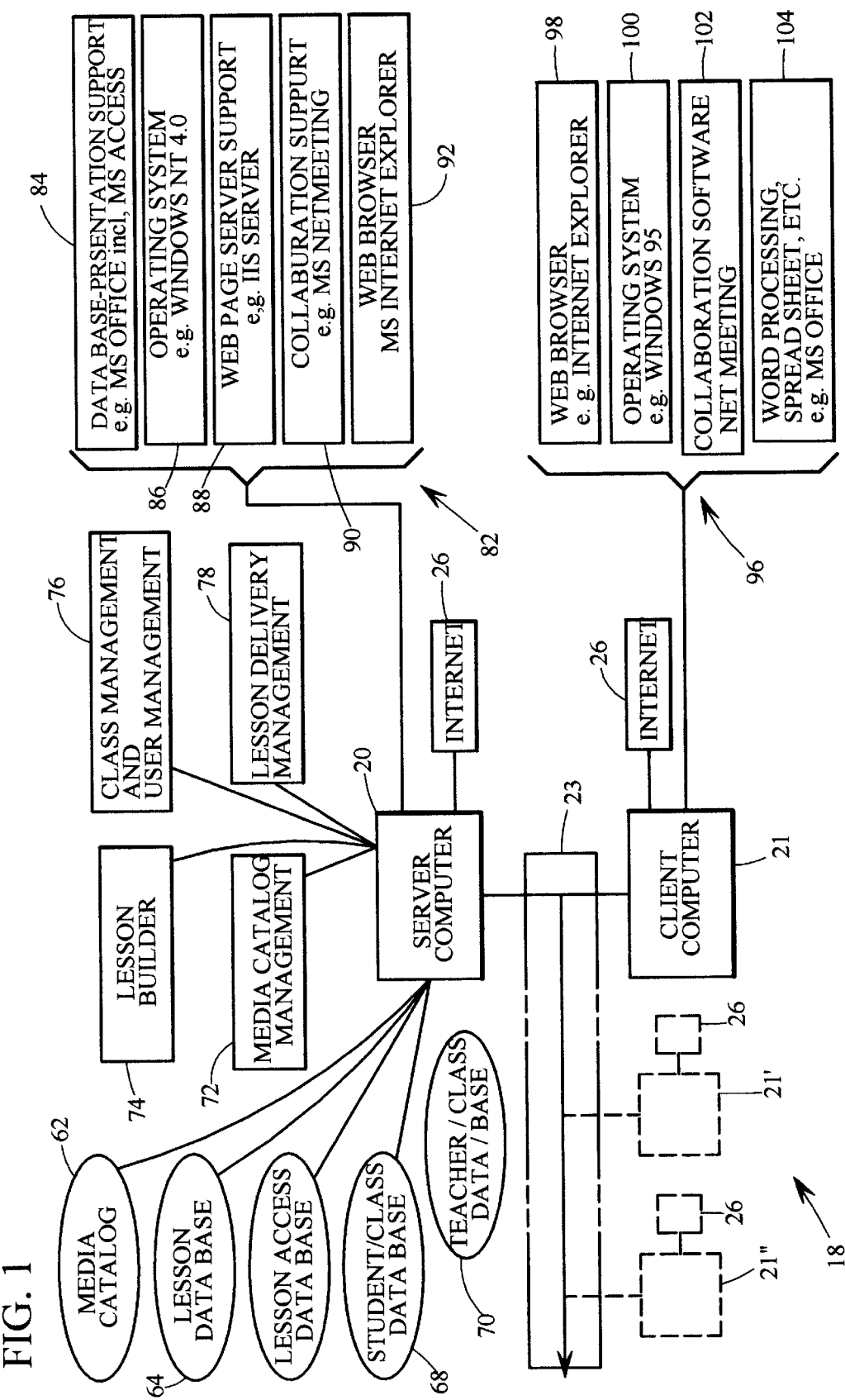
FIG. 1 is a block diagram of a preferred embodiment of the computer-based educational system of the present invention.

FIG. 1 generally illustrates one embodiment of a computer-based educational system 18 according to the present invention. The computer-based educational system 18 includes a server computer 20 and at least one client computer 21 connected to the server computer 20 via a network, such as an intranet 23 within a school system. In general, however, the server computer 20 and the client computer 21 can each access the Internet, as indicated by reference numeral 26, and thus can communicate exclusive of the intranet 26. Typically, several client computers will be in communication with the server computer 21, as indicated by the dotted boxes 211" and 21", either by way of the intranet 23 or the via an Internet 26, or both. It is the communication between the client and server computers that is required; the means of communication can vary. For example, the server and client computers can communicate using modems and telephone lines without accessing the Internet, though such a method is less preferable in light of the current ease and economy of using the Internet.

Figure 2A:
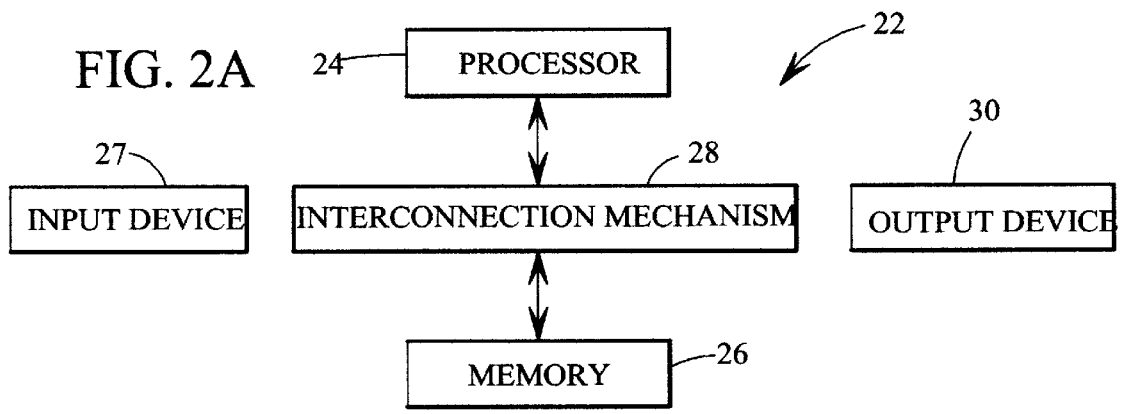
FIG. 2A is a schematic illustration of a computer, and is representative of the server and client computers of FIG. 1.
Figure 2B:
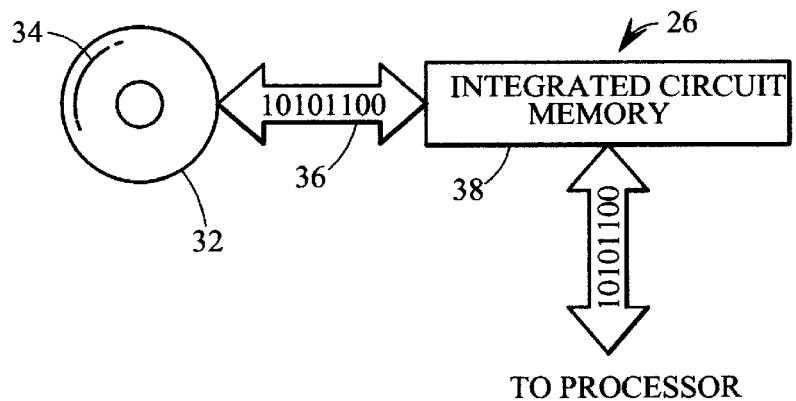
FIG. 2B is a schematic illustration representative of the memory of the computer of FIG. 2A.
Figure 2C:
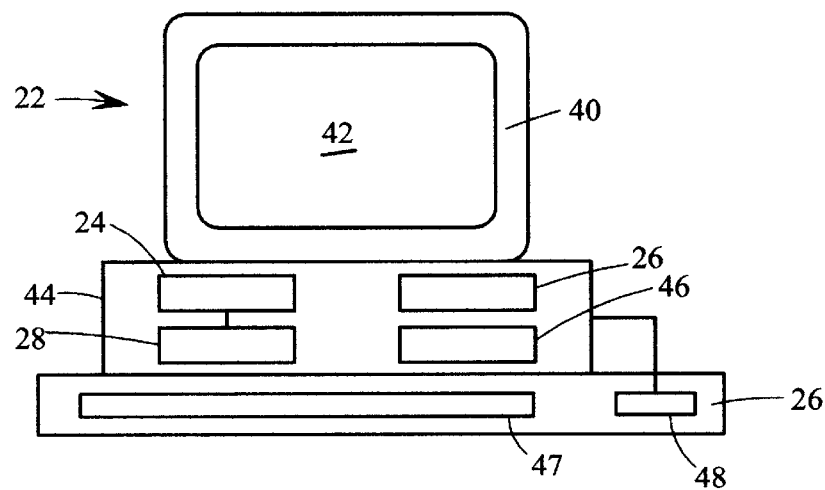
FIG. 2C illustrates a personal computer as one example of the computer illustrated in FIG. 2A.

However, before proceeding with FIG. 1, reference is made to FIGS. 2A–2C schematically illustrating a computer 22 representative of the server computer 20 and the client computer 21. As shown in FIG. 2A, a typical computer 22 includes a processor 24 connected to a memory system 26 via an interconnection mechanism 28. An input device 26 is also connected to the processor 24 and memory system 26 via the interconnection mechanism 28, as is an output device 30. Exemplary input devices include a keyboard, a keypad, a track ball, a mouse, a pen and tablet, and a communication device. Exemplary output devices include a cathode ray tube display (CRT), a liquid crystal display (LCD), a printer, additional storage devices, communication devices, such as a modem or network card, and audio devices, such as a sound board/speaker device for providing audio output. It is understood that one or more input devices 26, or one or more output devices 30, can be connected to the computer 22, and that the invention is not to be limited to one device. For example, subsequent reference will be made herein to the use of a mouse and to "clicking" with the mouse on a particular item displayed on a display. Such reference is merely exemplary. One of ordinary skill understands the above pointing and selection operation can be accomplished by another type of input device, such as a pen and tablet.

The computer 22 can be a general purpose computer system which is programmable using a high level computer program language such as C, Pascal, Visual Basic or Java. The computer can also be specially programmed using special purpose hardware, can be a multi-processor computer system, or can include multiple computers connected over the computer network. The processor 24 is typically a commercially available microprocessor of which the series X86 processors available from Intel and the 680X0 series microprocessors available from Motorola are examples. Many other processors are available. Such a microprocessor executes a program called an Operating System of which Unix, DOS, VMS and Windows NT4 are examples. The operating system controls the execution of other computer programs and provides scheduling, debugging, input/output control, such as for GPIB connections, accounting, compilations, storage assignment, and memory management, communication control, and related services.

The processor 24 and operating system define a computer platform for which application programs and various programming languages may be written. It is understood that the invention is not limited to a particular computer platform, particular computer 22, or particular high-level programming language. In the exemplary embodiment described herein, the processor of the server computer 20 is a 200 MHz Pentium" (i.e., a "586") processor running the Windows NT4 operating system. In addition, the client computer preferably includes at least a 133 MHz Pentium" processor and runs the Windows 95" operating system, and both computers run several standard applications programs, as described below. However, as understood by one of ordinary skill in the art, these programs serve to impart a particular functionality to the computer-122, and the invention is not to be limited to the use of a particular application program. Such functionality can be accomplished by custom programming using an appropriate high-level language, or by the use of a different commercially available application program. For example, the use of the Internet browser MS Explorer" will be referred to herein. One of ordinary skill understands that the Netscape" Internet browser, or any other type of Internet browser may be equally suitable.

An example of the memory system 26 is shown in FIG. 2B. The memory system 26 typically includes a computer readable and writeable non volatile recording medium 32 of which a magnetic disk, tape and a CD-ROM are examples. The disk can be removable (a floppy disk) or can be a permanent hard drive. In the embodiment illustrated in FIG. 2B, the medium 32 is a disk which includes a number of tracks as indicated by reference numeral 34 in which signals are stored in binary form i.e., a form interpreted as a sequence of one's and zero's such as shown by reference numeral 36. Such signals may define an application program to be executed by the processor 24 or information stored on the medium 32 to be processed by an application program. Typically, in operation the processor 24 causes data to be read from the nonvolatile recording media 32 into an integrated circuit memory element 38, which is typically a volatile random access memory, such as dynamic random access memory (DRAM) or static memory (SRAM). The integrated circuit memory element 38 allows for faster access to the information by the processor 24 than does the medium 32. The processor 24 generally manipulates the data within the integrated circuit memory 38 and then copies the data to the medium 32. A variety of mechanisms are known for managing data movement between the medium 32 and the integrated circuit memory element 38 and the invention is not limited thereto. The invention is not limited to a particular memory system. Preferably, however, the server computer 20 includes at least 64 MB of RAM, and a CD-ROM library for storing data, such as lesson material, and/or programs, such as application programs.

Preferably, the sever and client computers 20 and 21 are personal computers, such as the personal computer 22 shown in FIG. 2C. The output device 30 (in FIG. 2A) of the personal computer 22 typically includes a monitor 40 having a display screen 42, and a modem 36 for communicating with other computers via the Internet. The input device 26 is preferably a keyboard 47 and includes a mouse 48. The processor interconnection mechanism 28 and memory 26 are typically housed within a case 44 on top of which sits the monitor 40. It is understood that server computer 20 need not include a monitor 40 and that users of the educational system 18 can access the server computer 20 via the client computer 21.

Returning to FIG. 1, the educational system 18 includes several data bases. The media catalog 62 is a searchable catalog of references to lesson material, with the actual lesson material stored locally in "media" folders on the server computer 20 or on the Internet. The lesson database 64 is a database of lesson plans and associated student lesson pages, in any, that can be delivered to the student users using the client computer 21. Lesson plans include additional information associated with a lesson, typically for use by a teacher in creating, modifying or assigning a lesson. The student/class database 68, the teacher/class database 70, and the lesson access database 71 allow particular teachers and students to be associated with a particular class, and selected students to have access to lessons.

The server computer 20 also includes several functional capabilities, represented for purpose of illustration as functional blocks, or modules, 72, 74, 76 and 78. The media catalog management module 72 manages the media catalog, facilitating searching of the media catalog 62 for lesson material and the storing of references to lesson material obtained from other sources in the media catalog 62. The lesson builder module 74 allows a teacher to build lesson plans and associated student lesson pages incorporating lesson material in the latter, such as lesson material found from a search of the media catalog. The class and user management modules 76 function with the lesson database 64, student/class database 68, teacher/class database 70, and the lesson/class database 71 to provide a means for searching these databases and organizing students, teachers, and lessons for purposes of conducting classes. The lesson delivery management module 78 delivers lessons to a student using the client computer 21 such that the student accesses the lesson using a web browser running on the client computer 21, as is explained in more detail below.

According to the preferred embodiment, generally available application programs based on the Windows™ operating system are used to accomplish much of the above functionality and maintain the databases of the educational system 18. As indicated generally by reference numeral 82, running on the server computer 52 are a database presentation and support application 84, such as MS Office™. (including MS Access™); an operating system 86, which as indicated above is preferably Windows NT4; a web page service support application 88, such as IIS Server™; a collaboration support application 90, such as MS NetMeeting™; and a web browser 92, such as MS Internet Explorer™. The web browser is useful if a user such as a teacher or a student wishes to interact with the server computer 20 directly via a terminal attached thereto.

Similarly, the client computer 21 preferably includes standard available software packages such as web browser 98, such as MS Explorer ; an operating system 100, such as MS Windows 95™; collaboration software 102, such as MS NetMeeting™, and presentation software 104, such as MS Word™, or for enhanced capabilities, MS Office™.

The server computer 20 is configured both as a domain name server (via the Window NT4 installation) and a web server. The educational system 18 is implemented as a collection of web-based applications and webs, with web pages served to the client computer 21 from the server computer 20.

Figure 3:
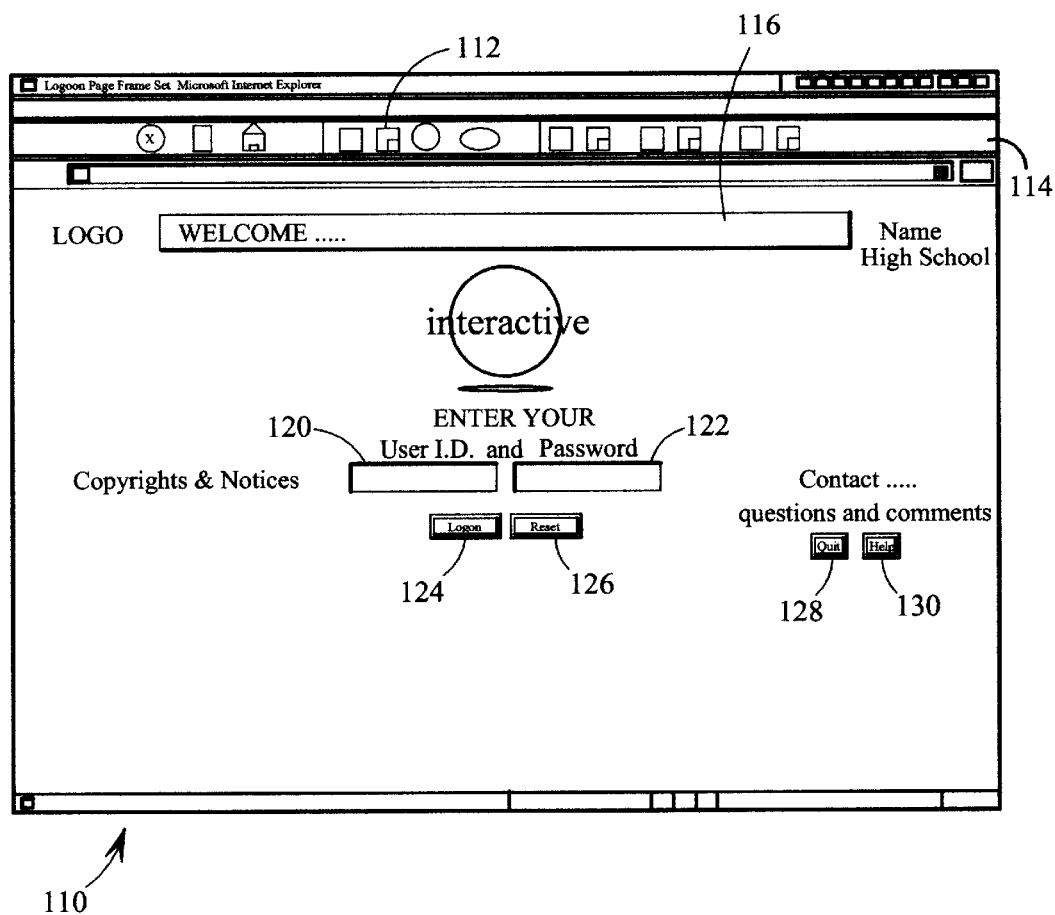
FIG. 3 illustrates the Logon Page served by the server computer of FIG. 1.

FIG. 3 shows a typical Logon Page 110 presented to a user accessing the server computer 20 via the client computer 21. Page 110 is presented to the user via the browser 98 and includes a typical menu bar 112, tool bar 114, and "http" address field 116. The Logon Page 110 provides an I.D. text entry field 120, a password text entry field 122, a "logon" button 124, a "reset" button 126 for clearing the text entry fields, and quit and help buttons 128 and 130, respectfully.

Upon logon, the education system 18 presents to the user a Student Home Page if the user is a student, a Support Home Page if the user is a "support" user, a Teacher Home Page if the user is a teacher, and an Administrative Home Page if the user is an "administrative" user. The Student Home Page and a typical lesson are first discussed. Subsequently, with an understanding of a lesson, the Teacher Home Page and the media catalog and lesson builder modules are discussed. Thereafter, features of the Administrative and Support Home Pages are discussed.

Figure 4:
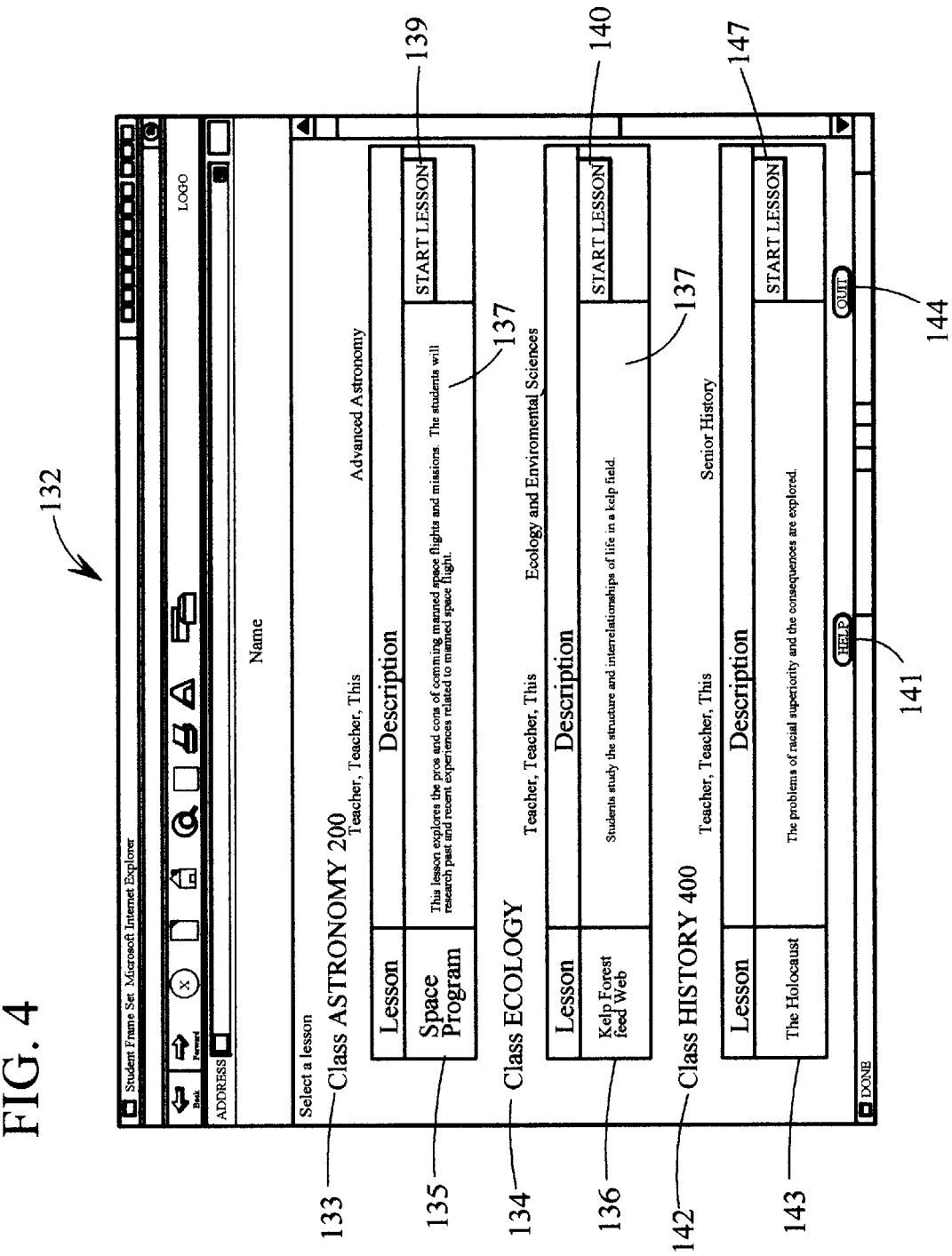
FIG. 4 illustrates an example of a Student Home Page served by the server computer of FIG. 1.

FIG. 4 illustrates a home page 132 shown to a student user logging onto the educational system 18. In the example illustrated, the student is in three classes—"Astronomy 200", "Ecology" and "History 400" as indicated by reference numerals 133, 134 and 142, respectively. In each class a lesson is assigned, as indicated by reference numerals 135, 136 and 143. Text blocks 137, 138 and 145 give a brief description of each of the assigned lessons. "Start Lesson" buttons 139, 140 and 147 are provided for initiating the lessons. In addition, a "help" button 141, and a "quit" button 144 are provided at the bottom of the page 132. The lessons 135, 136 and 143 shown in FIG. 4 are links to web pages that begin each lesson. Each lesson's first and subsequent (web) pages include a navigation scheme, and the student only needs to follow the "directions" implicit in the navigation scheme to proceed through a given lesson. From a functionality viewpoint, for the student to be able to see the lesson, a web is created for each lesson. A student, class or some other grouping of student users is added to the lesson's "permission to run" list. As understood by one of ordinary skill in the art, based on the disclosure herein, some customization of the Internet browser is typically required to achieve the functionality described herein.

Figure 5:
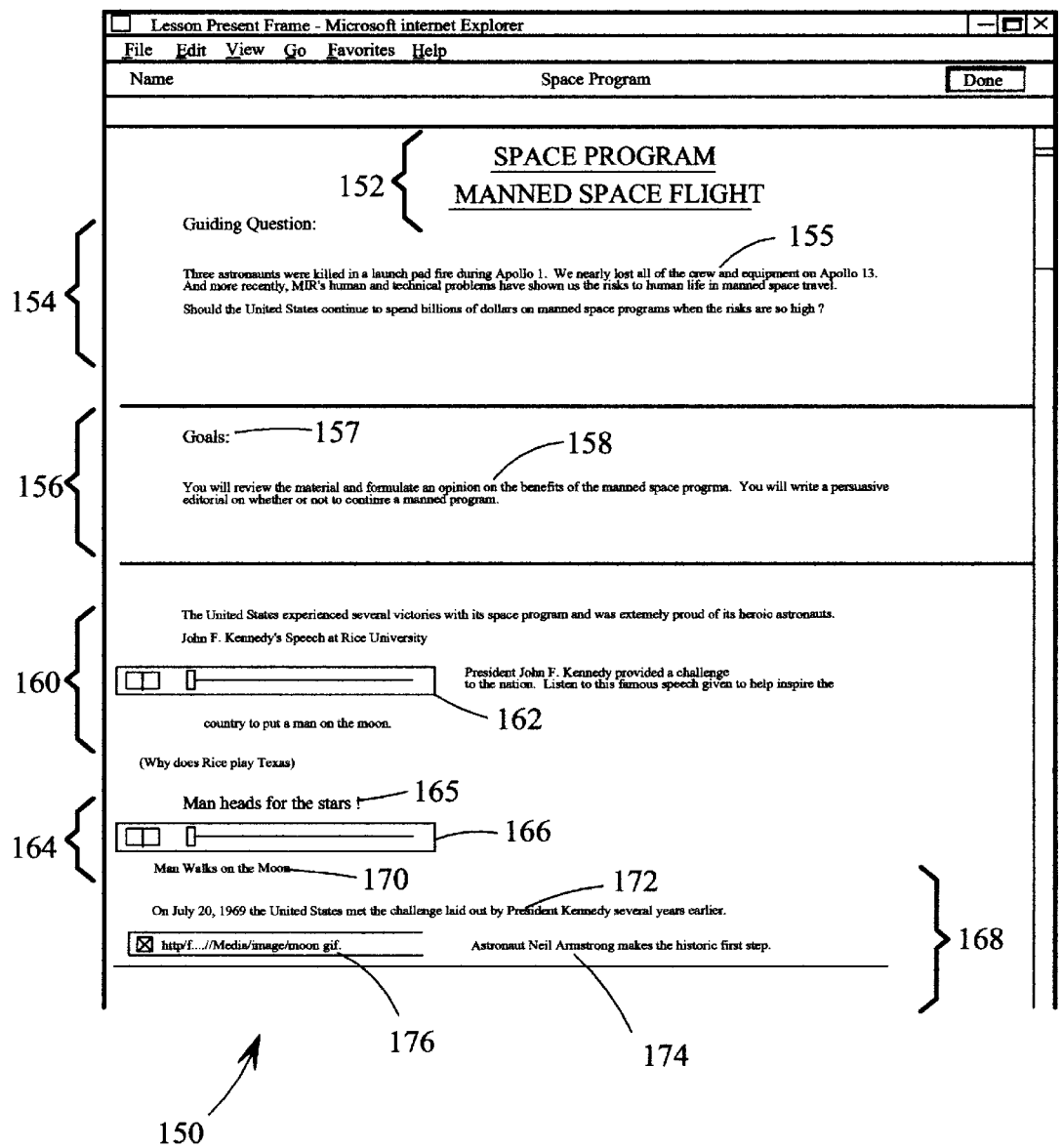
FIG. 5 illustrates a first portion of a lesson delivered by the computer-based educational system of FIG. 1 and accessed by a student user via the Student Home Page of FIG. 4, and illustrates the presentation of lesson elements, including textual lesson material and other media lesson material.

The lesson 135, "Space Program", is now considered in further detail to illustrate the operation of the lesson delivery management module 78. Upon activating the respective "Start Lesson" button 139, page 150 shown in FIG. 5 is presented to the student. The lesson 150 includes several lesson elements, each of which can include text, image, and video/audio material, and links thereto, as well as links to application programs. Lesson element 152 includes a title text block "Space Program", and a header text block "Manned Space Flight." Lesson elements 154 and 156 also include text blocks 155, 157, and 158, explaining the question guiding the lesson 155 and the goals of the lesson (157, 158). Lesson element 160 includes both textual and audio material. The audio file is played, over speakers associated with the client computer 21, by the student clicking on the "play" button of the display 162. Lesson element 164 includes a video of a rocket launch. Clicking the "start" button of the display 166 of the lesson element 164 plays the video for the student. Lesson element 168 includes text, as indicated by reference numerals 172 and 174, and an image 176. The image 176 is displayed as a URL reference, rather than display the image itself.

Figure 6:
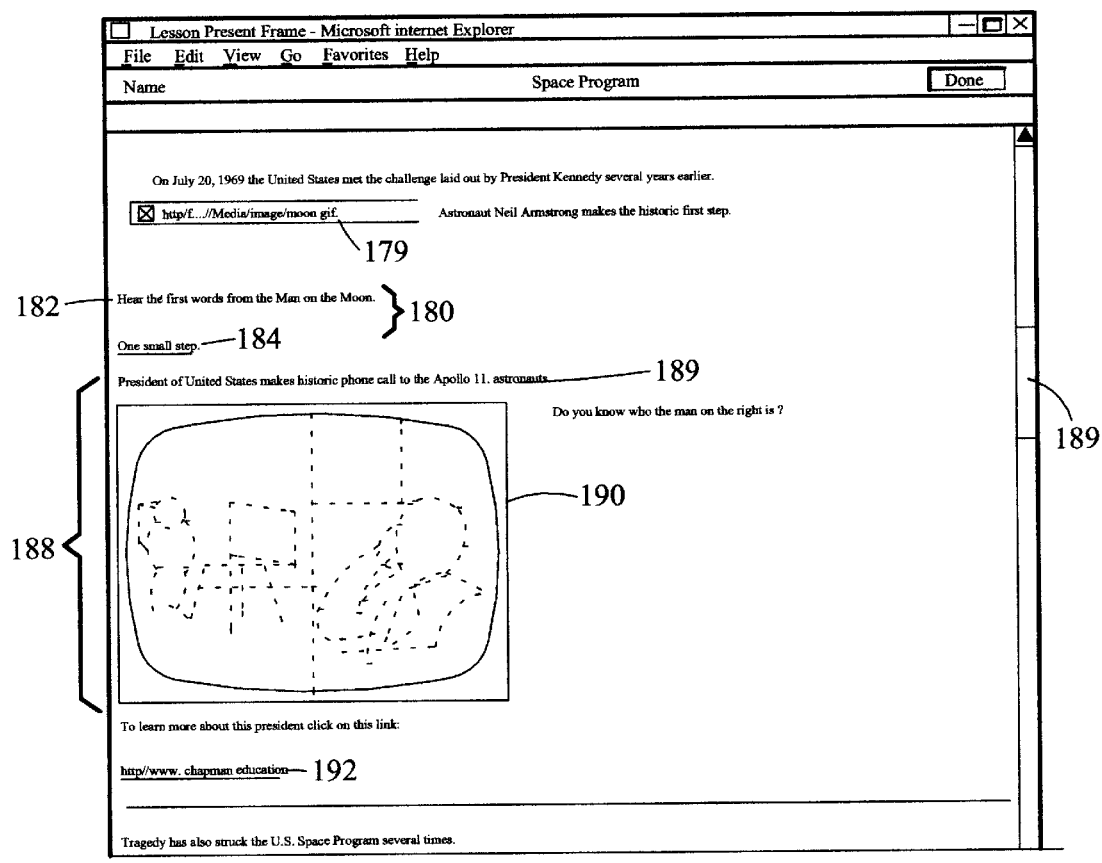
FIG. 6 illustrates a second portion of the lesson of FIG. 5, showing additional lesson elements, including images and links.

Additional lesson elements are shown in FIG. 6. Lesson element 180 includes text 182 and link 184 ("one small step") to an audio file of Neil Armstrong's words upon first stepping upon the moon. Lesson element 188 includes text block 189 as well as an image 192 showing President Nixon speaking on the phone with the Apollo 11 astronauts. The lesson element also includes a link 192 that will lead the student to an Internet site that provides more information about President Nixon.

Figure 7:
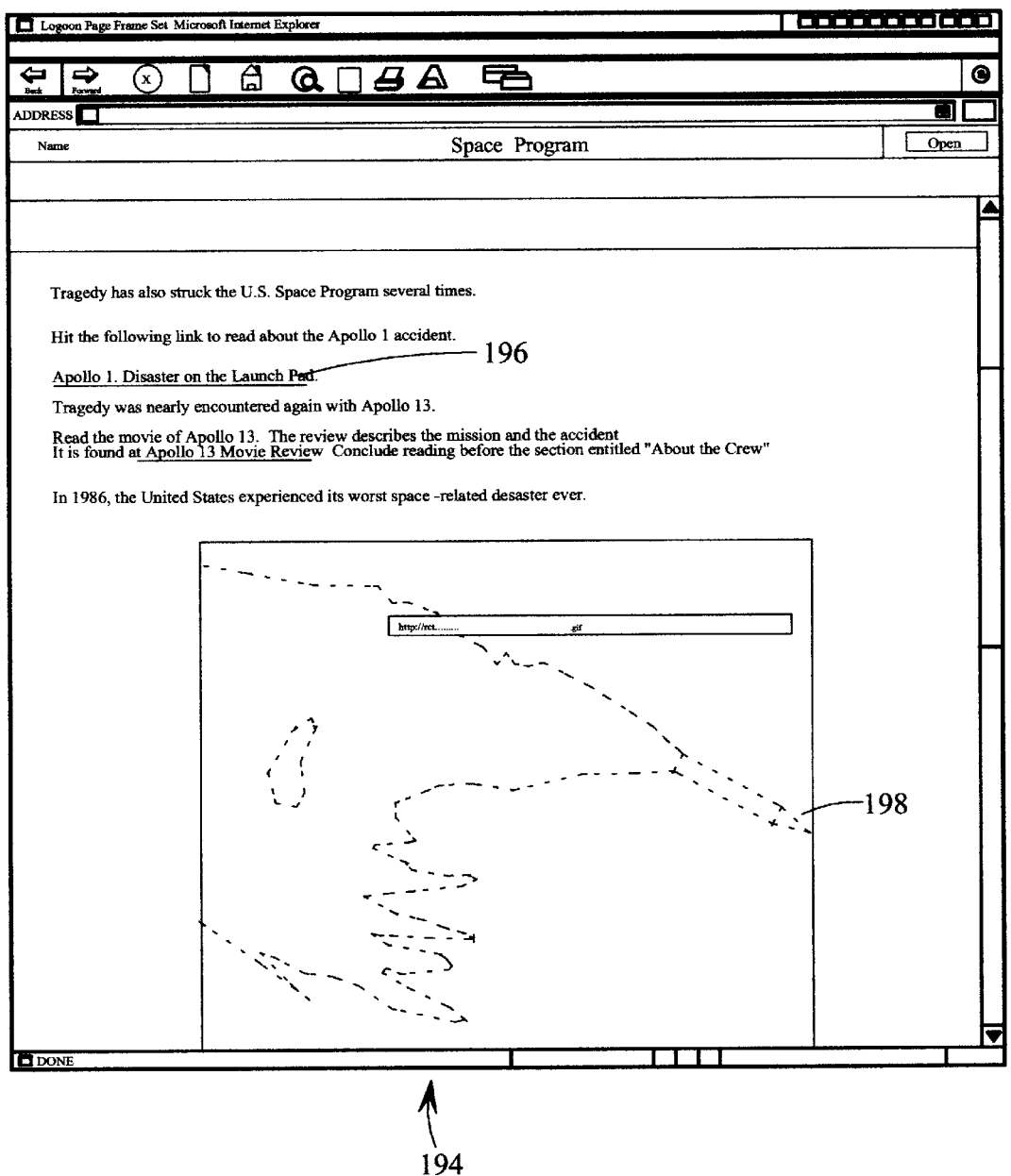
FIG. 7 illustrates a third portion of the lesson of FIG. 5, and lesson elements in addition to those of FIG. 6.
Figure 8:
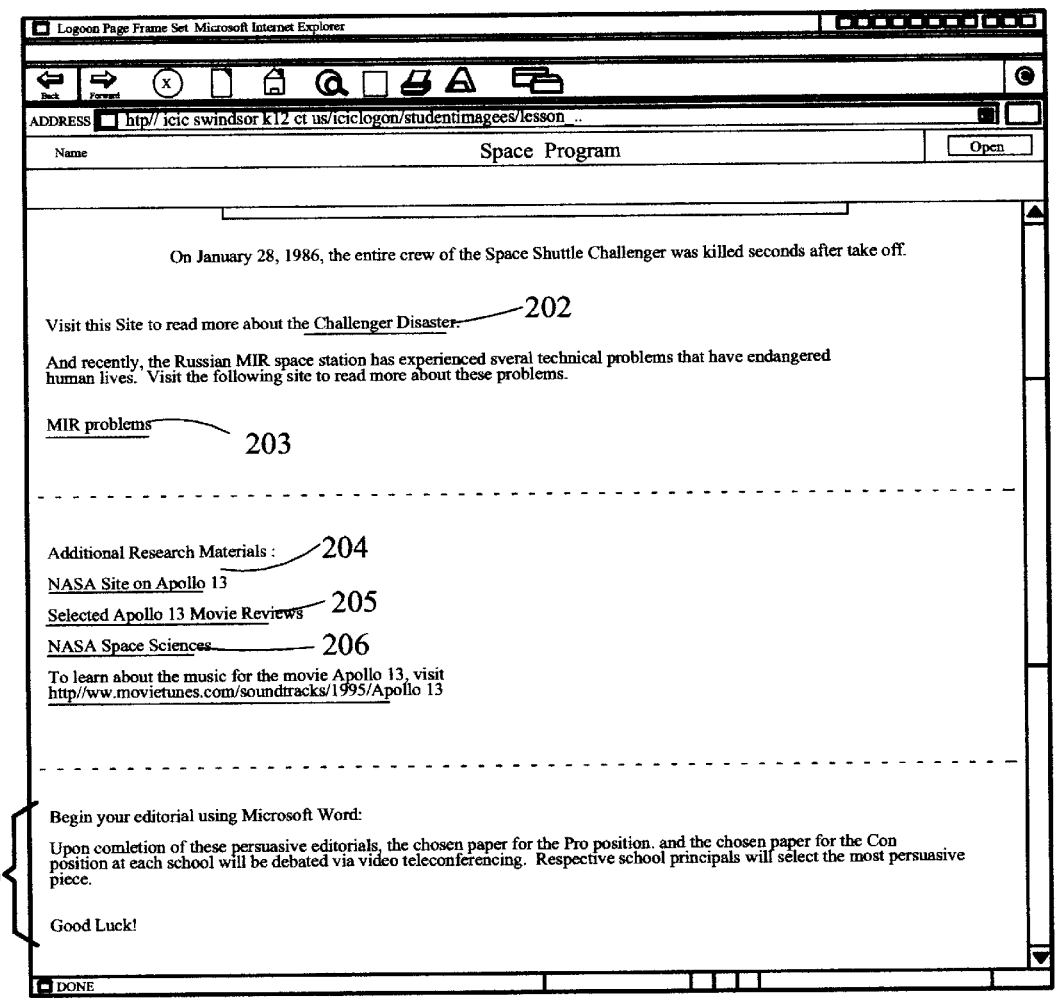
FIG. 8 illustrates a fourth portion of the lesson of FIG. 5 and further elements of the lesson.

FIGS. 7 and 8 illustrate the remainder of the lesson 135. The material in FIGS. 7 and 8 is organized into lesson elements, though for brevity, each is not detailed with an individual reference number. FIG. 7 shows, in addition to text, another link 196 and an image 198 of the Challenger Disaster of 1987. In FIG. 8, the lesson includes links 202–206, and a lesson element 210 assigning to the student the task of writing an editorial regarding the space program.

The lesson element 210 can include a link that activates MS Word" such that the student is presented with a new document in which to enter his or her editorial. Also, using collaboration software applications 90 and 102 indicated in FIG. 1, multiple students can work together on a Microsoft Word™ editorial, a Powerpoint Graph™, or other lesson project. Furthermore, the lesson can include a button for submitting the finished editorial to the teacher for grading and an evaluation. For purposes of simplicity a rather short lesson has been shown in FIGS. 5–8. More sophisticated lessons are possible, as will be evident from the discussion of the lesson builder module 74 below. The lesson delivery module 78 (FIG. 1) provides the page(s) shown in FIGS. 5–8 to the student. Rather than provide one scrolled page, the educational system 18 can provide the lesson as a series of separate lesson pages.

Figure 9:
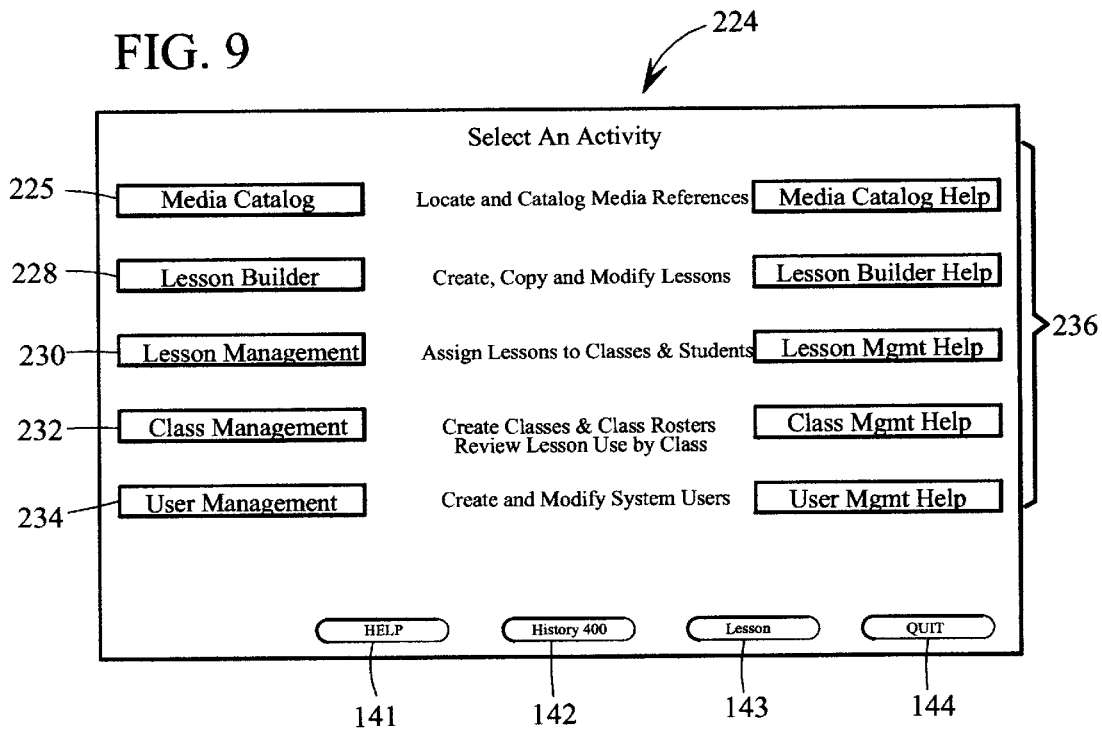
FIG. 9 illustrates the Teacher Home Page presented by the computer-based educational system of FIG. 1.

FIG. 9 depicts the Teacher Home Page 224 accessed when a teacher logs on to the Logon Page 110 shown in FIG. 3. Provided on the Teacher Home Page 224 are a "media catalog" button 225 for accessing the media catalog via the media catalog management module where multimedia or other lesson content references can be stored, reviewed, edited and retrieved; a "lesson builder" button 228 for activating the lesson development and management pages, and in turn allowing the user to create, copy, modify and delete lessons; "lesson management" button 230 for facilitating the assignment of lessons to classes and individual students; and "class management" button 232 for creating classes and assigning students to those classes; and a "user management" button 234 for managing the capabilities available to, and required by the various users of the educational system 18 by, for example, changing user passwords, and for reviewing student logon information. In sum, the computer-based educational system identifies authorized users, ascribes a "type" to each user (e.g., teacher, student, support and administrative), and permits access to certain features of the system depending upon the "type" ascribed to the user. These latter management functions are accomplished via the class and user management module 76 of FIG. 1. "Help" buttons 236 provide help information to aid in the use of each of the buttons 225–234.

The use of the media catalog management module 72 in conjunction with the media catalog database 62 is next described.

Clicking on the "media catalog" button 225 accesses the media catalog database 62. The media (alternatively referred to as "content") catalog 62 is a database of references to lesson material. The media catalog management module 72 allows searching of the media catalog for lesson material, and the addition and retrieval of lesson material based on the references in the media catalog. Lesson material is typically text, audio, images, video and application program files. A teacher using the lesson builder module can build a lesson by drawing material from the media catalog database. As is described in more detail below, lesson material can be added to the media catalog 62.

The media catalog 62 is a "catalog" and does not contain the actual lesson material, but rather catalogs references to the lesson material. The actual lesson material, if stored locally, i.e. on a memory of the computer-based educational system, is stored in lesson material folders, and typically each type of media is associated with a particular folder. For example, a teacher may locate useful images on the Internet, and desire to use the media catalog to allow later incorporation of the images into a lesson. The media catalog database lists and identifies the Internet URL addresses of the pictures, or the file name and lesson material folder in which the images have been saved. The media catalog 62 does not include the actual images. The media catalog 62 and the lesson material folder(s) thus serve as a lesson material database.

Actually maintaining all lesson material in the lesson material folders is possible, but is considered to place significant restrictions on the size and number of lesson material items that can be stored and searched. The use of a catalog approach is preferable, allows references to arbitrary types of lesson material, and allows the material to be maintained in any form or location desired.

The media catalog 62 entries can include reference entries that reference lesson material, such as audio material (e.g., a .wav file); an image (e.g., a .jpg, .bmp, or .gif file); video material (e.g., an .avi or mpg file); link (e.g., an "http" address); applications (e.g., an external executable program); text (e.g., an MS Word" document); and other resources (e.g., an on-line, digital library); and link (e.g., an http address).

Each media catalog entry can include a textual description and associated keywords to support the rapid and concise retrieval of references of interest when searching the catalog. The referenced lesson material can typically be previewed to aid the teacher in selecting lesson material for inclusion in a lesson via the lesson builder module 74.

Figure 10:
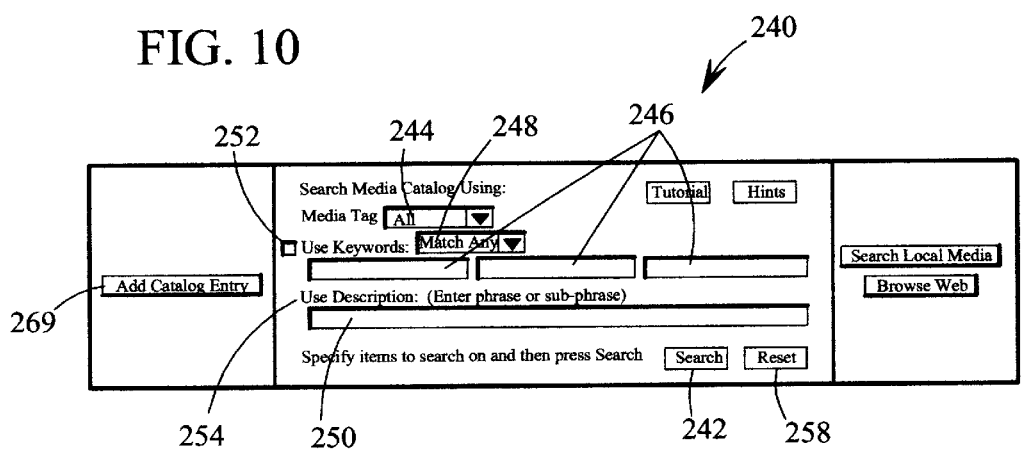
FIG. 10 illustrates the Media Catalog Management Page for managing the media catalog of entries, which are references to lesson material, and which is accessible from the Teacher Home Page of FIG. 9.

Clicking on the "media catalog" button 225 in the Teacher Home Page 224 of FIG. 9 accesses the Media Catalog Management Page 240, as shown in FIG. 10. The Media Catalog Management Page 240 supports the following activities: searching the media catalog; adding new entries to the media catalog; modifying existing entries to the catalog; deleting existing entries; and previewing the lesson material that an entry references. Each of these activities is next described in turn.

Clicking the "search" button 242 searches the media catalog database 62. A variety of search parameters are available. The media (also referred to as "media tag)" pull down menu 244 allows a selective search for "all", "audio", "image", "video", "link", "application", "text", and "other resource" types of entries. Keyword entry fields 246 allow for the entry of up to three keywords, with the associated pull down menu providing a choice of returning catalog entries that match any one of the keywords, or only those entries that match all of the keywords. The description field 250 allows searching for a phrase or subphrase. The check boxes 252 and 254 allow a search 178 based on the keywords (up to three, or other desired number) entered into the keyword fields 246, or the entry into the description field 250. Checking both boxes 252 and 254 results in a search based on the entries in the keyword fields 246 and the description field 250.

Leaving the fields 246 and 250 blank retrieves all catalog entries. The user may then refine the search using keywords and descriptions. The "reset" button 258 can be used to clear entries if an error is made when entering or selecting a parameter.

The media catalog 62 can be accessed during the development of a lesson or lesson plan with the lesson builder module 74, as is discussed in more detail below, allowing a teacher to search for lesson material during the lesson development process. It is typically not required that references to lesson material be placed into the media catalog 62 for the lesson material to be incorporated into a lesson. For example, a teacher can search the Internet (see the "Browse Web" button of FIG. 10) during the process of creating a lesson and directly incorporate a reference to lesson material into the lesson such that the material appears in the lesson (assuming the reference link remains valid) without placing the reference in the media catalog.

Clicking on the "search" button 242 displays the results of the search on a screen display indicated generally by reference numeral 260 in FIG. 11. The Media Catalog Search Results 262 are shown preceded by a page number, as indicated by reference number 263. The Search Results List 262 typically includes the following information: the type of the catalog reference entry (i.e., link, audio/video, etc.); the reference location (such as an "http" address on the Internet or the location of a folder on the server if the reference is stored locally); and a description of the catalog entry using the keywords that have been associated with the entry by the user who placed the entry in the media catalog. If more than one page is required to display the results of the search, buttons are provided to access any page directly, the "next" page, or the "previous" page. Alternatively, rather than presenting the search results organized by pages, a scroll bar may appear to the right of the search results list 262.

A particular media catalog database entry may be viewed by clicking on the reference, such as the reference 265, which opens the indicated item and allows the user to review the information present. After review, the browser "back" button (not shown in FIG. 11) can be used to return to the display of FIG. 11, or alternatively, the "ALT" and "back" arrow keys on the keyboard may be used.

As shown in FIG. 11, the search results page 260 retains the display of the search page 240 so that new keywords and descriptions may be entered to refine the search as necessary. For example, to narrow the search the user can click on the button adjacent to the content type pull down menu 244 and select "audio". Similarly, the key words entered into the key word field 246 may be changed, or the entry for the description field 250 may be changed. Clicking on the "search" button 242 in FIG. 11 re-executes the search.

For example, images from the space program lesson shown in FIGS. 5–8 can be retrieved from the media catalog database 62. To search or retrieve such images a user would select "images" from the "Media Tag" pull down menu 244 of FIGS. 10 and 11. The user would also check the use keywords check box 252. The word "Apollo" can be entered into any of the keyword fields 246, and clicking the "search" button 242 will initiate the search. The images shown in the space program lesson illustrated above are then retrieved in a catalog entry list, such as catalog entry list 262 shown in FIG. 11.

The media catalog management module 72 allows for new entries to be added to the media catalog database by clicking on the button 269 of FIGS. 10 and 11. Upon clicking the button 269, the "add catalog entry" form of FIG. 12 appears and provides a reference field 274 for the entry of an Internet web address or a file location; a description field 276 for the entry of a description of the catalog entry to be saved; a media tag field 278, with a pull-down menu, for associating a media category with the entry; a keyword field 280 allowing for the entry of up to 5 keywords; and a copyright information field 281. The reference field 274 should contain an "http://" prefix. The prefix can reference a site or media item on the Internet or data stored on the server computer 20. Clicking on the "save" button 282 saves the catalog entry. A message indicating that the entry has been saved is displayed. Clicking on the "reset" button 283 allows all entries to be cleared to correct for any error made during entering data in the fields 274–281.

Figure 13:
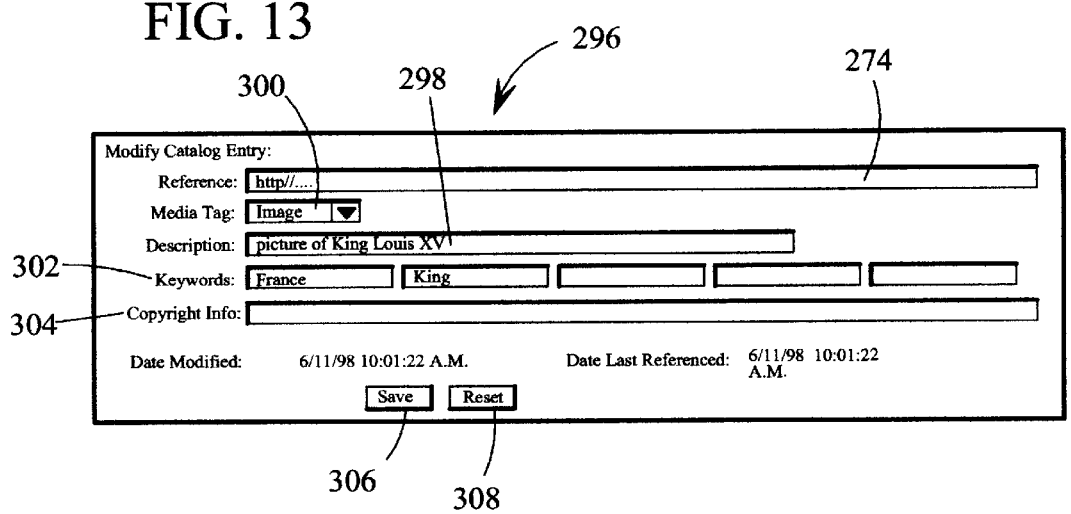
FIG. 13 illustrates the Modify Catalog Entry Form for modifying a reference entry to the media catalog, and which can be accessed from the Media Catalog Search Results Page of FIG. 11.

Referring back to FIG. 11, lessons located in a search may be modified or deleted via use of the respective "modify" and "delete" buttons, such as "modify" button 290 and "delete" button 292. Clicking the "modify" button 290 displays the Modify Catalog Entry Form 296 shown typically in FIG. 13. Fields 298, 300, 302 and 304 allow modification of the description, the content or media type, the keywords and the copyright information, respectively, associated with the catalog entry. This form also displays the date and time of the last modification of the entry, and the date and time that the entry was last referenced.

Clicking on the "save" button 306 saves any changes entered into the fields 298 to 304. The "reset" button allows the fields to be cleared to correct for errors, and restores the original entries to the fields 298–304. One reason that catalog entries may need periodic modification is due to a phenomenon known as "link rot". Link rot means that an Internet site has been moved, or been renamed or deleted such that an attempt to log onto the site results in an error message. Accordingly, it may be preferable to store lesson material locally on the server computer 20 rather than make extensive use of links to Internet sites.

Figure 14:
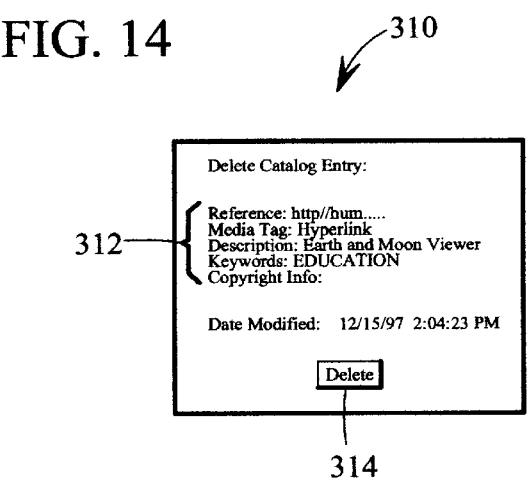
FIG. 14 illustrates the Delete Catalog Entry Form for deleting a reference entry from the media catalog, and which can be accessed from the Media Catalog Search Results Page of FIG. 11.

With reference again to FIG. 11, it is possible to delete a particular catalog entry via use of a respective "delete" button, such as the "delete" button 292. Clicking on the "delete" button 292 will display the Delete Catalog Entry Form 310 shown in FIG. 14. Clicking the "delete" button 314 deletes a respective entry 312 from the media catalog 62 and the associated lesson material, if any, from the shared media folder of the server computer 20.

Examples are now given of acquiring information from the Internet and storing references to the information in the media catalog 62. The lesson material is stored using tools commonly available on the software running on the client computer 21. In the examples that follow, references are made to certain tools or buttons present in the Microsoft Internet Explorer™ browser. However, the present invention is intended to be useful with any of numerous other browsers, such as the Netscape Navigator™ browser. One of ordinary skill will readily understand how to make any modifications required to use a different browser.

Because the media catalog 62 is accessed using a browser running on the client computer 21, at any time a user may open a new browser window and search the Internet. Assume that the user has searched and found lesson material that he or she wishes to incorporate into a lesson and to store in the lesson material catalog 62. The user selects the "http" address of the image using the edit and copying function of the browser menu. On Microsoft Internet Explorer™, the user can click the right mouse button and select "copy" from the pop-up menu. To paste information to the media catalog 62, the cursor is positioned in the desired field and the material pasted in the field.

For example, if a useful description of a particular picture appears on a website and the user would like to incorporate that description into the description field of the add entry catalog form 272 shown in FIG. 12, that description can be copied from the website and pasted into the description field 276.

Examples are now given incorporating lesson material itself from the web site to the educational system 18, including storing the link to the web site as a reference in the media catalog 62, or storing the material itself in the memory of the server computer 20 and storing a reference to that memory location in the media catalog.

Figure 15:
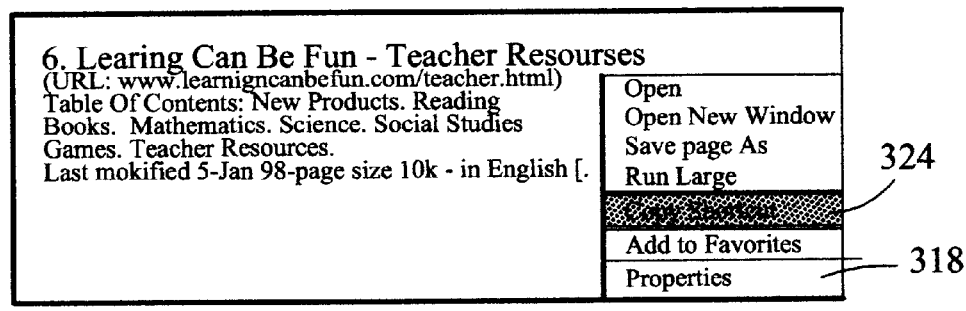
FIG. 15 shows a menu presented by the Internet browser upon clicking a selected mouse button, and useful for obtaining the "http" reference of selected lesson material found on the Internet.
Figure 16:
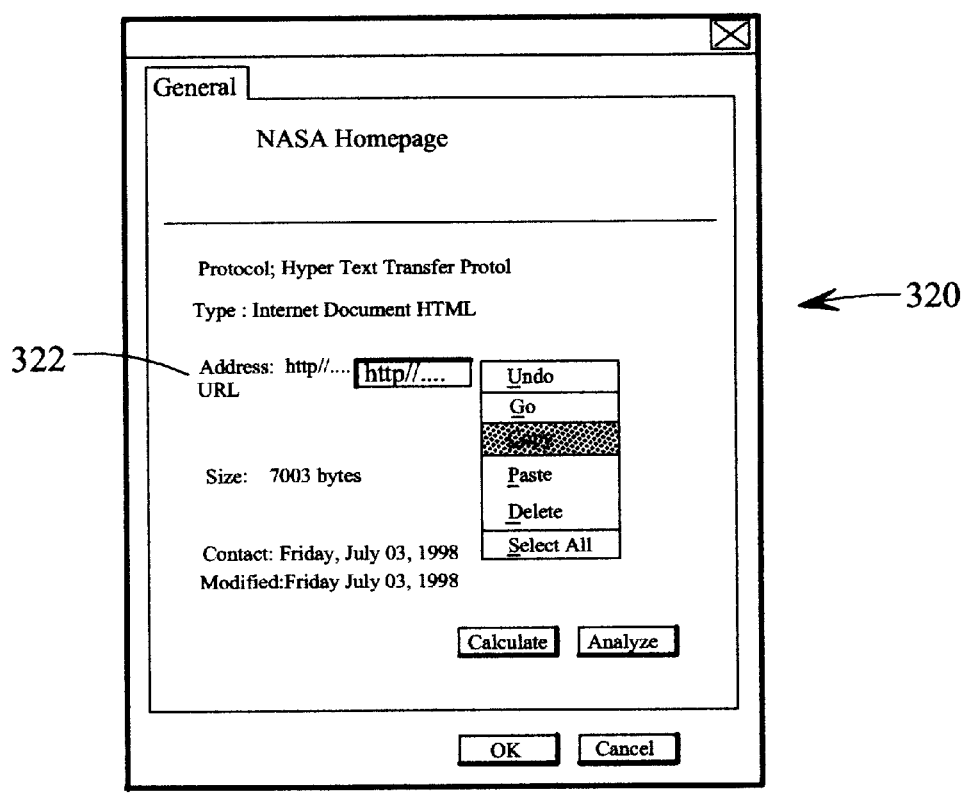
FIG. 16 shows the property page displayed upon selecting the "properties" item of the menu of FIG. 15, and displaying the "http" reference of the selected reference material found on the Internet.
Figure 17:
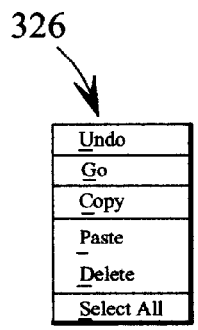
FIG. 17 illustrates a menu presented by the Internet browser upon clicking a selected mouse button with the cursor on the property page of FIG. 16, and useful for pasting the "http" address of the selected lesson material into the reference field of the Add Catalog Entry Form shown in FIG. 12 in order to add a reference entry to the material to the media catalog.

A link reference to an interesting web site may be included in a lesson. One such link is the link 192 in FIG. 6, which a student can click to learn more about President Nixon. To copy a reference to a web site or a web page into the media catalog 62, the user brings up the particular web site or page of interest in a window of the browser. Pointing the cursor anywhere on that page (though not on an image or a link) and clicking the right mouse button brings up a menu 316 as shown in FIG. 15. Clicking on the "properties" item 318 of the menu 316 presents the user with a property page 320 shown in FIG. 16. The user then positions the cursor over the "http" address 322, highlights and copies the address, and pastes the address into the reference field 274 of the Add Catalog Entry Form 272 shown in FIG. 12. The other fields of the entry form 272 in FIG. 12 are completed as appropriate. An alternate method to obtain the URL address 322 in FIG. 16 is to select the item "copy shortcut" 324 from the pop-up menu 316 shown in FIG. 15. The user is presented with the menu 326 shown in FIG. 17, and can paste the URL address to the reference field 274 of the Add Catalog Entry Form 372 shown in FIG. 12.

Rather than store the link to a web page, the user can store a link to the image. The user points the cursor to the image he or she desires to copy and clicks the right mouse button. From the pop-up menu 316 in FIG. 15, the user selects the "properties" item 318, double clicks the left mouse button on the address URL that appears in the property page 320 (FIG. 16), highlights the reference URL and copies the reference to the clipboard. The reference is then pasted into the reference field 274 of the add new entry form 272 of FIG. 12.

Figure 18:
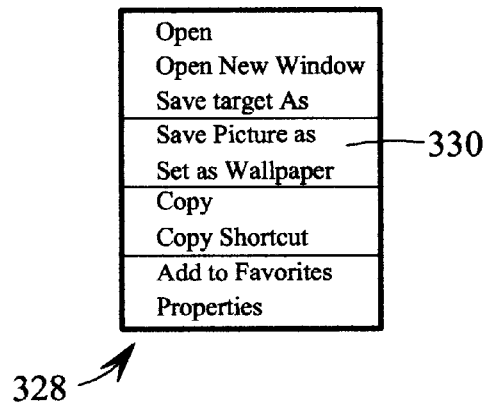
FIG. 18 shows a "pop-up" menu presented by the Internet browser, and useful for saving image lesson material in a lesson material folder on the hard drive of the server computer of FIG. 1.
Figure 19:
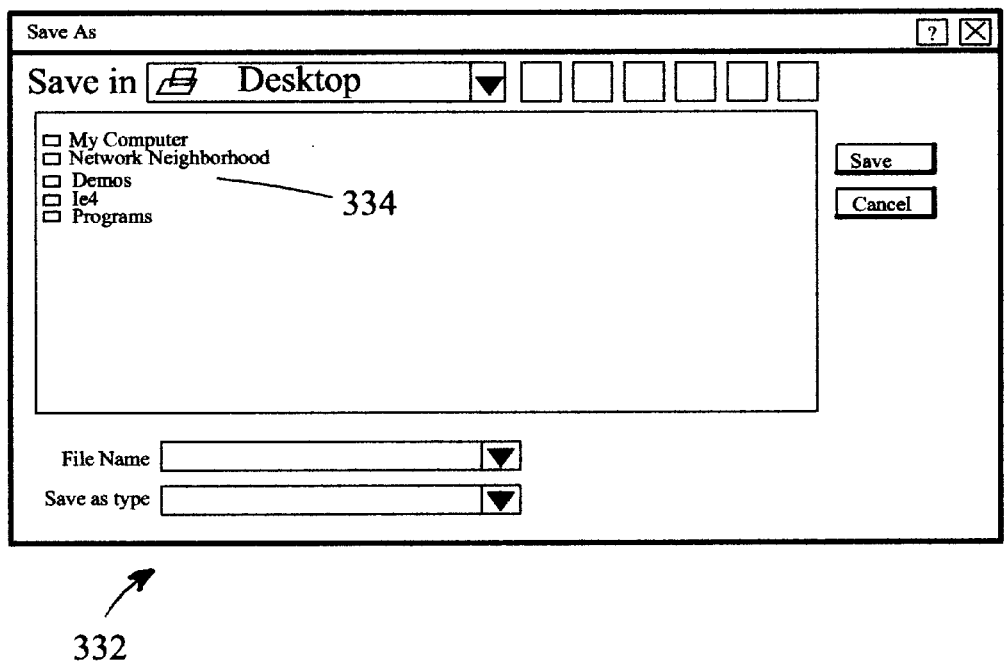
FIG. 19 shows the "Save As" window presented by the operating system, and useful for selecting the lesson material folder into which to save the image lesson material selected using the "pop-up" menu of FIG. 18.

Alternatively, the user can copy the image and store the image itself in the media folder of the server computer 20. The user places the cursor on the image and clicks the right mouse button. From the pop-up menu 328 shown in FIG. 18, the user selects the "save picture" menu item 330, and saves the image on the hard drive of the server computer 20 on folders and subfolders that have been set up for storing lesson material. For example, in the Windows 95 "Save As" window 332 shown in FIG. 19, the user clicks on the "network neighborhood" entry 334, locates the server computer 20 (e.g., eh-iclc) and double clicks. Next, the user locates the media folder, double clicks, and locates the appropriate sub-folder for images, and double clicks. The user then clicks on the "save" button. From form 240 or 260 of FIGS. 10 and 11, respectively, the user can click on the "add new entry" button to cause the Add Catalog Entry Form 272 of FIG. 12 to appear. In reference field 274 the user types in an appropriate reference. For example, to save a picture of Abraham Lincoln called "Lincoln.gif" to the "eh-iclc" server, a user would type the following: "http://eh-iclc/Media/Images/Lincoln.gif." The gif file is now stored in the media folder on the hard drive of the server computer 20.

The foregoing discussion describes many of the controls provided by the media catalog management module 72 for using the media catalog 62. Table I summarizes these controls.

TABLE I

Media Catalog Management Module Controls

| Control | Description |
| --- | --- |
| Close | This will close the media catalog maintenance window. |
| Add New Entry | Allows the creation of a new "catalog" entry. This will be performed using a separate maintenance page. |
| Reset | This will clear the form fields. |
| Save | This will save the modified or new information. |
| Delete | Allows the deletion of the media catalog entry currently being displayed. |
| Modify | The search results table will allow modification of individual entries to be initiated directly from the table. |
| Help | Provides the user with page specific help. This will also allow the user to access a more complete help and tutorial support capability. |
| Quit | This will terminate the user's activities and return to the logon page. |
| FAQ | Provides answers to frequently asked questions. |

With reference to the Teacher Home Page 224 shown in FIG. 9, clicking on the "lesson builder" button 228 activates the lesson builder module, allowing the teacher to create a lesson for presentation to students. Associated with a lesson is a lesson plan, which is a body of lesson information that documents the lesson. Lessons are stored in the lesson catalog database 64 where they can be retrieved for delivery to students by the lesson delivery management module 78. The lesson builder module 74 allows a teacher to search the lesson catalog database for existing lessons; to create a new lesson; to modify or delete an existing lesson; to display and print the lesson plan associated with a particular lesson; and to preview a lesson, that is, view the lesson as it will be presented to a student.

Upon clicking the "lesson builder" button 228 of the Teacher Home Page 224 (FIG. 9), the teacher is presented with the Lesson Builder Form Page 340 shown in FIG. 20. The Lesson Builder Form page 340 allows searching of the lesson catalog database 64 for existing lessons based on selected search criteria. The subject field 342 includes a pull down menu the user can use to select any of a plurality of different subject areas (e.g., Astronomy) provided on the menu. The grade level field 344 includes a pull-down menu the user can use to select the grade level. The Lesson Builder Form Page 340 also includes a lesson title field 346; a keyword field 350; and teacher field 348 for searching for lessons based on the title, selected keyword, or the name of the teacher, respectively.

The results of a typical lesson search are shown in FIG. 21. A list 352 of lessons that meet the search terms is provided. The list 352 includes each lesson's subject, title, teacher, and grade level information. Associated with each item on the list are "Lesson Plan", "Student Page" and "Select" buttons, indicated collectively by reference numeral 354. A list of all lessons in the lesson catalog database can be obtained by clearing all search fields, setting the subject and grade level fields to "all", and clicking on the "search" button 351 of FIG. 20.

Figure 22:
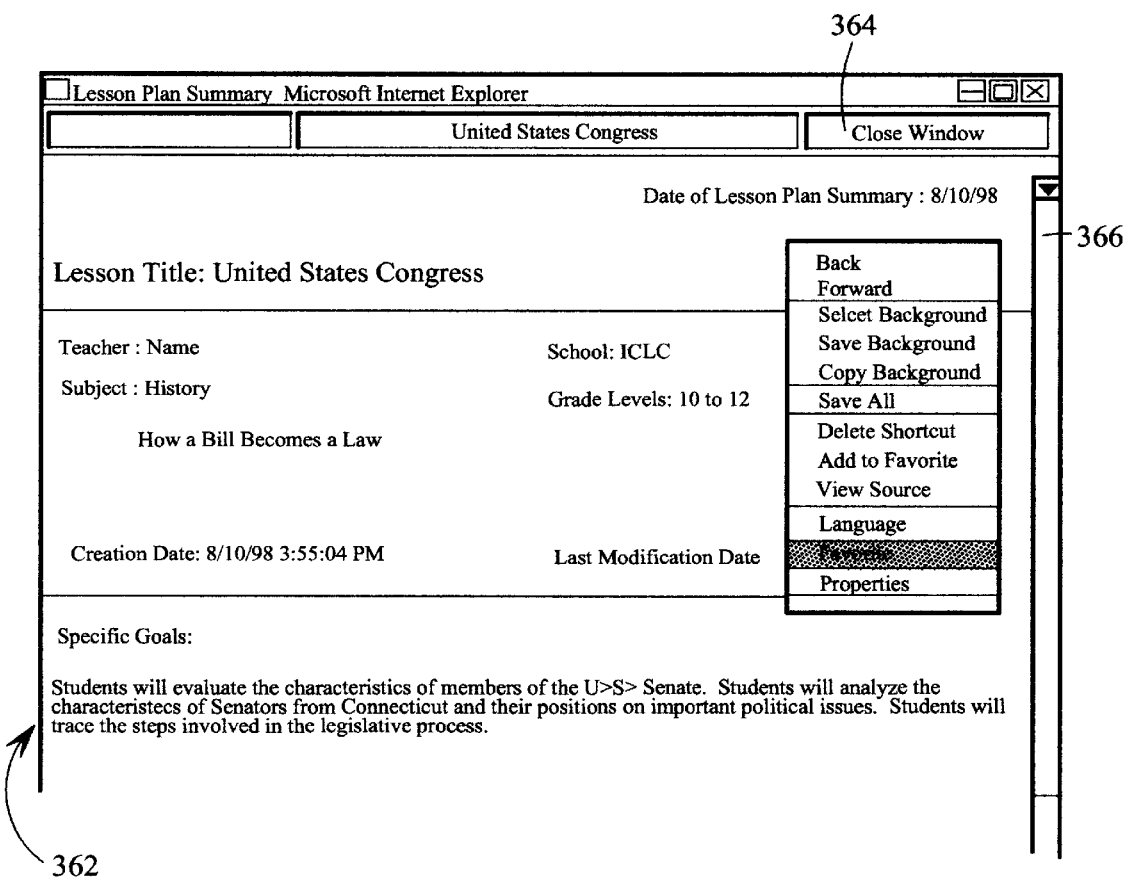
FIG. 22 shows a lesson plan presented upon selecting a "Lesson Plan" button associated with a typical lesson that may be listed in the search results list of FIG. 21.

Clicking on a "Lesson Plan" button, such as "Lesson Plan" button 358 associated with the lesson entitled "Famous Presidents" displays the respective lesson plan along with some other general information. FIG. 22 shows the results of pressing the "Lesson Plan" button associated with the an exemplary lesson entitled "United States Congress". The lesson plan summary is presented in a separate browser window 362. The lesson plan can be viewed by scrolling the scroll bar 366. The lesson plan entries are described in more detail below.

Clicking one of the "Student Page" buttons 359 shown in FIG. 21 provides for the teacher a preview of the lesson page presented to a student when he or she accesses that lesson via the browser program on the client computer 21. To copy, modify or delete an existing lesson, the teacher can click the "Select" button 360 shown in FIG. 21. The title, subject, lesson description, notes, responsible teacher, and keywords associated with the lesson are presented, as shown by page 370A in FIG. 23A for an "unpublished" lesson (or a "published" lesson for which the creator desires to allow modification by others), or by page 370B in FIG. 23B for a "published" lesson. In the unpublished lesson page 370A, the teacher may click on the "modify" button 372 to access the lesson elements for modification, may click on the "copy" button 374 to generate a copy of the lesson, or may click on the "delete" button 376 to delete the lesson. As indicated in FIG. 23B, when selecting a published lesson page created by another, the modify and delete buttons are not presented. If the teacher who has created the lesson does wish to allow modification of the lesson by others, the teacher can associate a password with a lesson, and the password must be entered for the lesson to be modified. Typically, a lesson cannot be deleted by any teacher other than the teacher who created it. Creation, modification, and deletion of lessons is described in more detail below.

Figure 24:
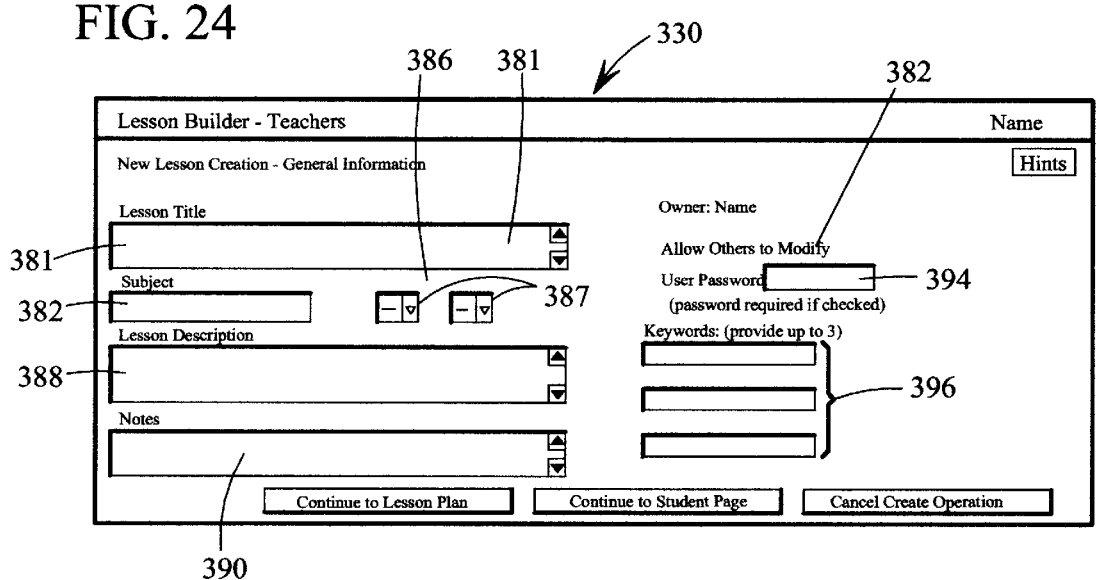
FIG. 24 illustrates the Lesson Builder Form Page presented upon selecting the "New Lesson" button of the Lesson Builder Form Page of FIG. 20.

Returning to FIG. 20, clicking on the "new lesson" button 379 displays the Lesson Builder Form Page 380 shown in FIG. 24. The Lesson Builder Form Page 380 includes entry fields for general information regarding the lesson, including the following: a lesson title field 381; a subject field 382, to which entries can be made using a pull-down list 384; grade level fields 386, to which entries can be made using pull-down lists 387; a lesson description field 388; a notes field 390; and three keyword fields, indicated by reference numeral 396.

A teacher can allow others to modify the lesson by checking the check box 392, and can require use of a password for such modification by entering a password in the password field 394. Clicking on the "Cancel Create Operation" button shown in FIG. 24 cancels the creation of the lesson and returns the teacher to the lesson select page 340 shown in FIG. 20. Selecting the "Continue To Lesson Plan" button allows the user to create the lesson plan, work on an outline for the lesson, and record notes for the lesson. Selecting the "Continue To Student Page" button allows the user to develop the lesson web page and all that makes up the respective lesson, including links to various materials, and activities for the student(s). In the preferred embodiment of the invention, clicking on either the "Continue To Lesson Plan" button or the "Continue To Student Page" button displays the "Lesson Builder" page 401 of FIG. 25.

The computer-based educational system of the invention allows a user to build both the lesson plan and the actual delivered lesson. The "lesson plan" is a plan used during the lesson development process to identify the goals, strategies and other information relevant to the lesson. As shown typically in FIG. 25, there are a plurality of sections in a typical lesson plan, and in the currently-preferred embodiment of the invention, these sections range from "Specific Goals" to "Bibliography" and are collectively identified by the reference numeral 394. The lesson development process of the invention allows a user to (1) determine and document the lesson objective(s), (2) research the topic or topics of interest, (3) select the appropriate instructional method(s), (4) decide how to organize the lesson, (5) choose support material, and (6) prepare the lesson outline.

Figure 25:
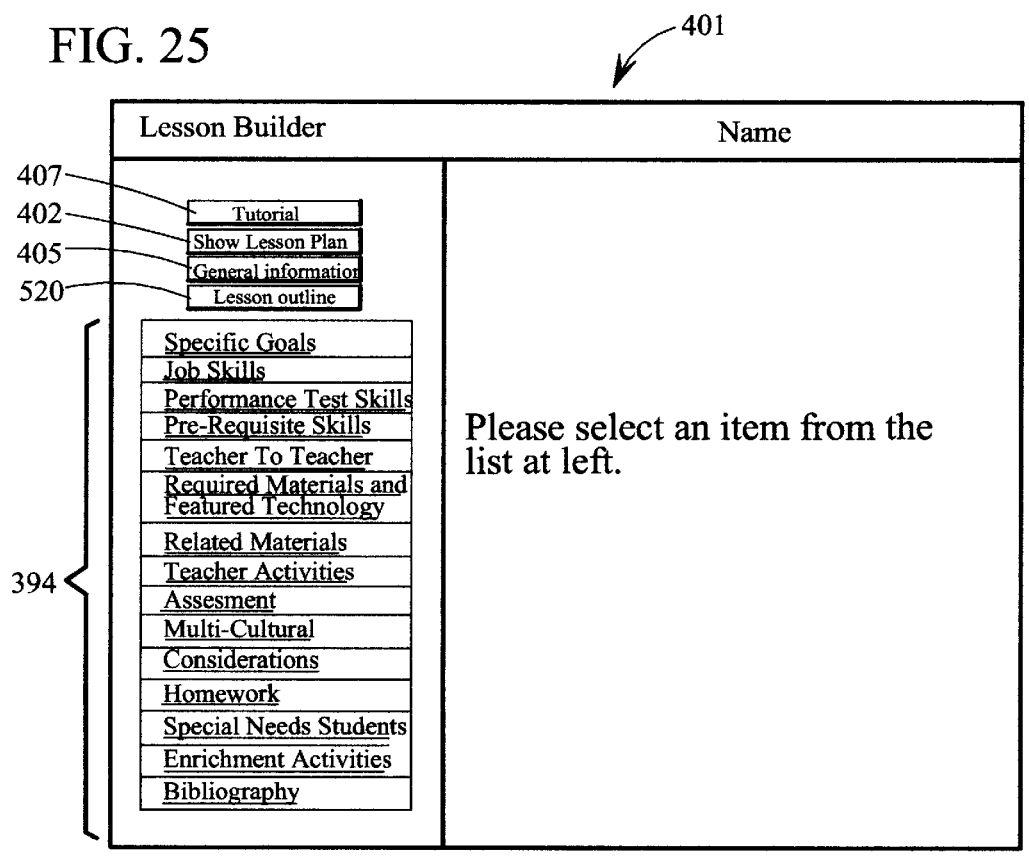
FIG. 25 illustrates the Lesson Plan Creation Screen for creating and managing lesson plan components that include information about the lesson, and which can be accessed by selecting the "Continue To Lesson Plan" button of FIG. 24.

Accordingly, the lesson plan components may be used by teachers during the lesson development process to identify the goals, strategies and other information relevant to the lesson. As shown in FIG. 25, the lesson plan components are presented in a the column of buttons 394 on the left-hand portion of the Lesson Plan Component Maintenance Page 401.

The information typically associated with each component or section 394 of the lesson plan is listed in Table II below. Preferably, the components may be selected and saved in any order.

TABLE II

Lesson Plan Components

| | |
|---|---|
| General Information | Lesson Title, Subject Selection, Lesson Description, Notes, Grade Levels, Responsible Teacher, Allow Others to Modify, and Password, Keywords, and the creation and last modified dates. This information is presented when creating and modifying a new lesson create and modify. |
| Specific Goals | What the student is expected to have learned after completing the lesson. Example: The student will be able to identify the planets of the solar system. |
| Job Skills | The career opportunities that are related to this lesson. Example: Journalism, Art History, English Teacher, Engineer. |
| Performance Test Skills | The specific skills which will enhance the student's ability to perform well, or respond successfully on standardized tests. Example: The student will analyze the consequences of the decision to drop the Atomic Bomb on Hiroshima and Nagasaki. |

TABLE II-continued

Lesson Plan Components

| | |
|---|---|
| Pre-requisite Skills | Prior knowledge the student should possess before doing the lesson. Example: The student must know the steps of the scientific method. |
| Teacher to Teacher | Information from the creator of the lesson and which may be useful to another teacher using the lesson. Example: This lesson is intended for use after the student has mastered the basic facts regarding World War II. The lesson should take about one hour to complete. |
| Required Materials & Featured Technology | These are the materials and resources the teacher must marshal before the lesson is delivered. Example: CD-ROM to be inserted in a drive of the server computer. |
| Related Materials | Details of other learning materials can be provided here, such as other Internet sites, books and other print materials, and sources of other ideas pertaining to the curriculum which may not be explicitly called for during the student lesson. Example: Students may search Encarta on-line for a biography of an artist who lived during the Middle Ages and then locate a book in the Media Center illustrating the artist's paintings. |
| Teacher Activities | This entry provides step-by- step activities that the teacher will engage in to teach the lesson. Example: Ask the students what they would like to learn about the Holocaust and list the responses on the board. Compare the answers to find common questions. |
| Assessment | This entry recommends the evaluation technique to be used to asses the student's performance. Example: At the end of the lesson, students are to enter their thoughtLs regarding the Holocaust into a personal diary. |
| Homework | This entry provides the recommended homework assignment. Example: Read pages 1–35 of the text. |
| Special Needs Students | This entry indicates how the lesson can be modified for students with special learning requirements. Example: Learning disabled students are asked to create a portfolio rather than take a written exam. |
| Multi-Cultural Activities | This entry indicates how the lesson is culturally and racially diverse. Example: A Japanese parent can be invited to the class to discuss the cuisine of Japan. |
| Enrichment Activities | This entry outlines additional learning tasks that can be performed by a |

TABLE II-continued

Lesson Plan Components

| | |
|---|---|
| | student who would like to pursue the topic in more detail. Example: A student can interview a veteran about the dropping of the Atomic Bomb on Japan. |
| Bibliography | This is a listing of materials associated with the lesson. |

Entering information for any of the above-identified sections or components of a lesson plan is optional, and the sections may be accessed in any order. In order to work on any one of these sections, the user selects the respective section button 394, and a two-field form will appear in the right-hand portion of the page for entry of the display information associated with the respective lesson plan section.

Figure 26:
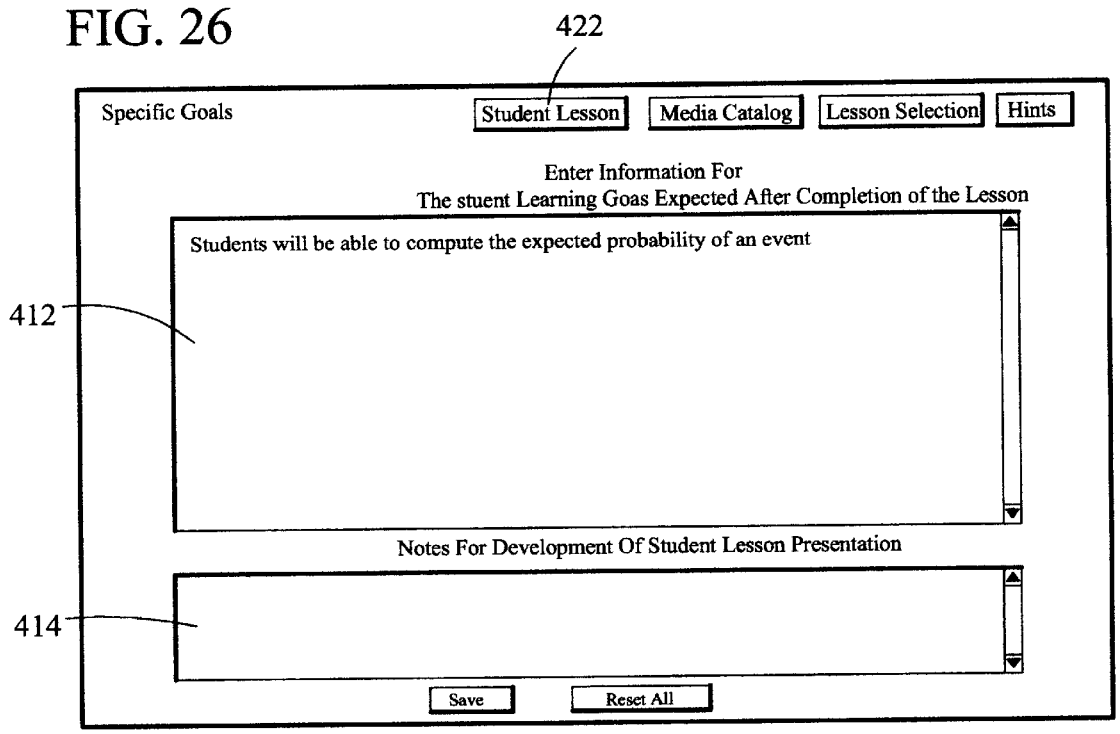
FIG. 26 illustrates a typical two-field form displayed upon selecting the "Specific Goals" component button of the Lesson Plan Creation Screen of FIG. 25 for entering and displaying lesson plan information, and any notes for development of the lesson presentation.

In FIG. 26, a typical two-field form displayed upon selection of the "Specific Goals" component button 394 is illustrated. A first field 412 entitled "The Student Learning Goals Expected After Completion Of The Lesson" is provided to allow the teacher to enter traditional lesson plan information, and is typically text-based information forming the framework and other features of the respective lesson. A second field 414 entitled "Notes For Development Of Student Lesson Presentation" allows the teacher to record specific information and notes for the respective student lesson. For example, while working on the specific goals of the lesson plan, the teacher may want to make goal-related notes for use later on when developing the associated student lesson pages. In addition, the teacher may insert into the second field 414 notes about what the students should be doing, specific text to be used in the lesson, or one or more Internet URLs to be included in the lesson as "hot links". Preferably, all information entered into the second field 414 of each two-field form is carried forward to use later on (e.g., by copying and pasting) while constructing the associated student lesson page(s). As also shown typically in FIG. 26, each two-field lesson section form includes a "Student Lesson" button to allow easy access to the student lesson development page, a "Media Catalog" button to allow easy access to the media catalog (through a separate browser window), and a "Lesson Selection" button to allow easy access to the lesson catalog. Turning again to FIG. 25, the "Lesson Builder" page 401 includes four other buttons for selection during the process of developing the lesson plan. Selecting the "Show Lesson Plan" button 402 allows the user to view the current lesson plan in the right-hand portion of the page, including the General Information data, the General teacher's Description, and any related notes. Selecting the "General Information" button 405 displays the general lesson information displayed upon creating the lesson, and including, for example, the lesson title, description and keywords. Preferably, this information can be modified upon selecting the General Information button 405. A "Tutorial" button 407 allows the user to access through a separate browser window a "Lesson Builder" tutorial which instructs the user through each step required to build a lesson plan and student lesson page(s). A "Lesson Outline" button 520 can be accessed at any time during the lesson planning process. Selecting this button displays a two-field form shown typically in FIG. 27. The first field 513 is entitled "Notes For Development Of Student Lesson Presentation" and provides a "scratch pad" for the teacher to enter ideas and concepts for the construction of the lesson (e.g., major topics to be covered and the general flow of the lesson), and/or time planning for the lesson. The second field 514 is entitled "Student Lesson Outline", and allows for the development of an outline of the actual student activities for the lesson. The information typically included in the second field 514 includes the time allocated for the student to complete the lesson and a short description of the student's activities. This information can be used to support the development of the actual lesson elements, and is displayed on many of the pages displayed by the lesson builder module 74. Help information also can also be obtained by clicking on the "help" button, not shown in the lesson plan component pages illustrated in FIGS. 35–27, but included as part of the browser window and shown, for example, in FIG. 4.

Provision for the creation of a detailed lesson plan is included to facilitate the process of creating and delivering lessons. However, a detailed lesson plan that includes entries for all lesson components is not required to create a student lesson. According to a preferred embodiment of the invention, only a lesson title and a lesson description need be entered, such as into fields 381 and 388, respectively, of the Lesson Builder Form Page 380 shown in FIG. 24, to proceed with creating a new lesson.

Figure 28:
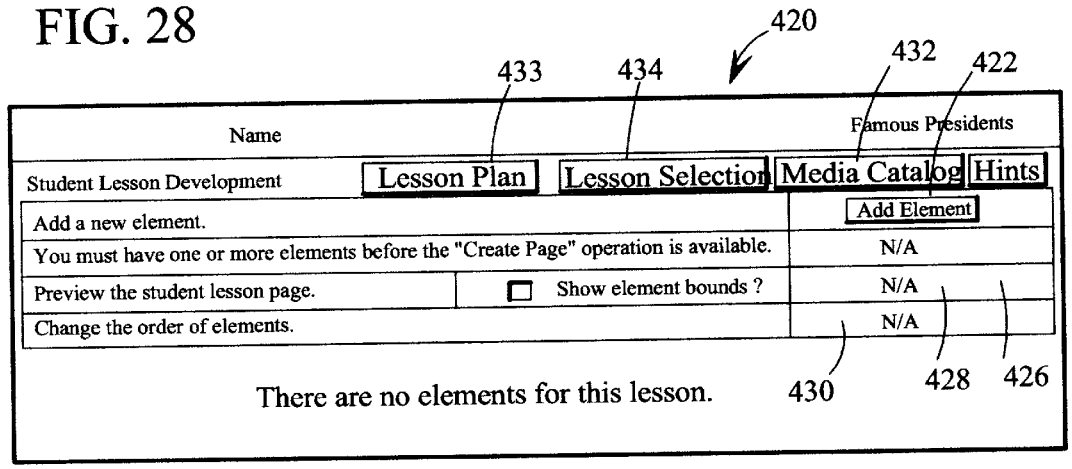
FIG. 28 shows the Lesson Development Page presented for incorporating lesson material into a lesson for presentation to a student.

The Lesson Development Page 420 shown in FIG. 28 is provided for incorporating lesson material into a lesson for presentation to a student. The Lesson Development Page 420 can be accessed by selecting the "student lesson" button 422 shown in the Lesson Plan Component Page of FIG. 26. The lesson material of a lesson is incorporated into the lesson as individual lesson elements 436 as discussed in conjunction with the lesson illustrated in FIGS. 5–8. The Lesson Development Page 420 includes an "add element" button 422 for adding lesson elements to a lesson; a "create lesson" button 426 for creating the student page(s) for delivery of the lesson to a student via the web browser running on the client computer; a "preview lesson" button 428 for previewing the student lesson; a "reorder elements" button 430 for changing the order of the lesson elements; a "media catalog" button 432 for accessing the media catalog to review available catalog entries (or to browse the Web); a "Lesson Plan" button 433 for reviewing the lesson plan; and a "Lesson Selection" button 434 for accessing the lesson catalog for searches. Note that in the exemplary screen display of FIG. 28, the Create Lesson, Preview Lesson, and Reorder Elements buttons 426, 428 and 430, respectively, are not made available until elements are added through button 422.

Figure 29:
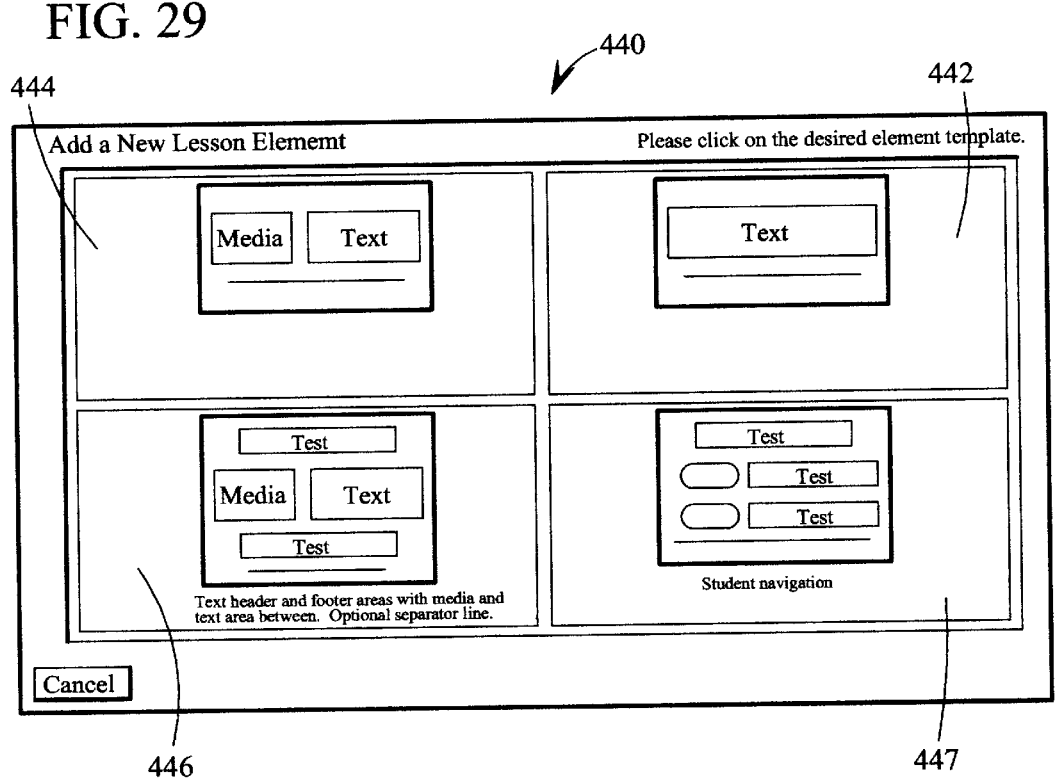
FIG. 29 illustrates the Lesson Element Template Page for incorporating lesson material into a lesson, and which can be accessed by selecting the "Add Element" button of the Lesson Development Page of FIG. 28.

Clicking on the "add element" button 422 of FIG. 28 displays the Lesson Element Template Page 440 shown in FIG. 29. The Lesson Element Template Page 440 provides four templates for incorporating lesson material into the lesson: a Text Only Template 442; an Other Media and Text Template 444; a Text, Other Media and Text Template 446; and a "Student Navigation" template 447. The Text Only Template 442 supports a single text item; the Other Media and Text Template 444 supports a left-justified other media item with optional text to the right; the Text, Other Media and Text Template 446 supports text above and below an other media-text item; and the Student Navigation template 447 allows the user to insert a "Navigation Element" into the lesson page. As described further below, a typical Navigation Element provides the student with selections, allows the student to navigate among the selections, and preferably records the student's selections to thereby allow the teacher to track the manner in which the student progresses through the respective lesson.

To create a lesson element in accordance with one of the templates, a teacher clicks on that template. Clicking on the Text Only Template 442 in FIG. 29 displays the Text Only Template page 448, shown typically in FIG. 30.

Figure 30:
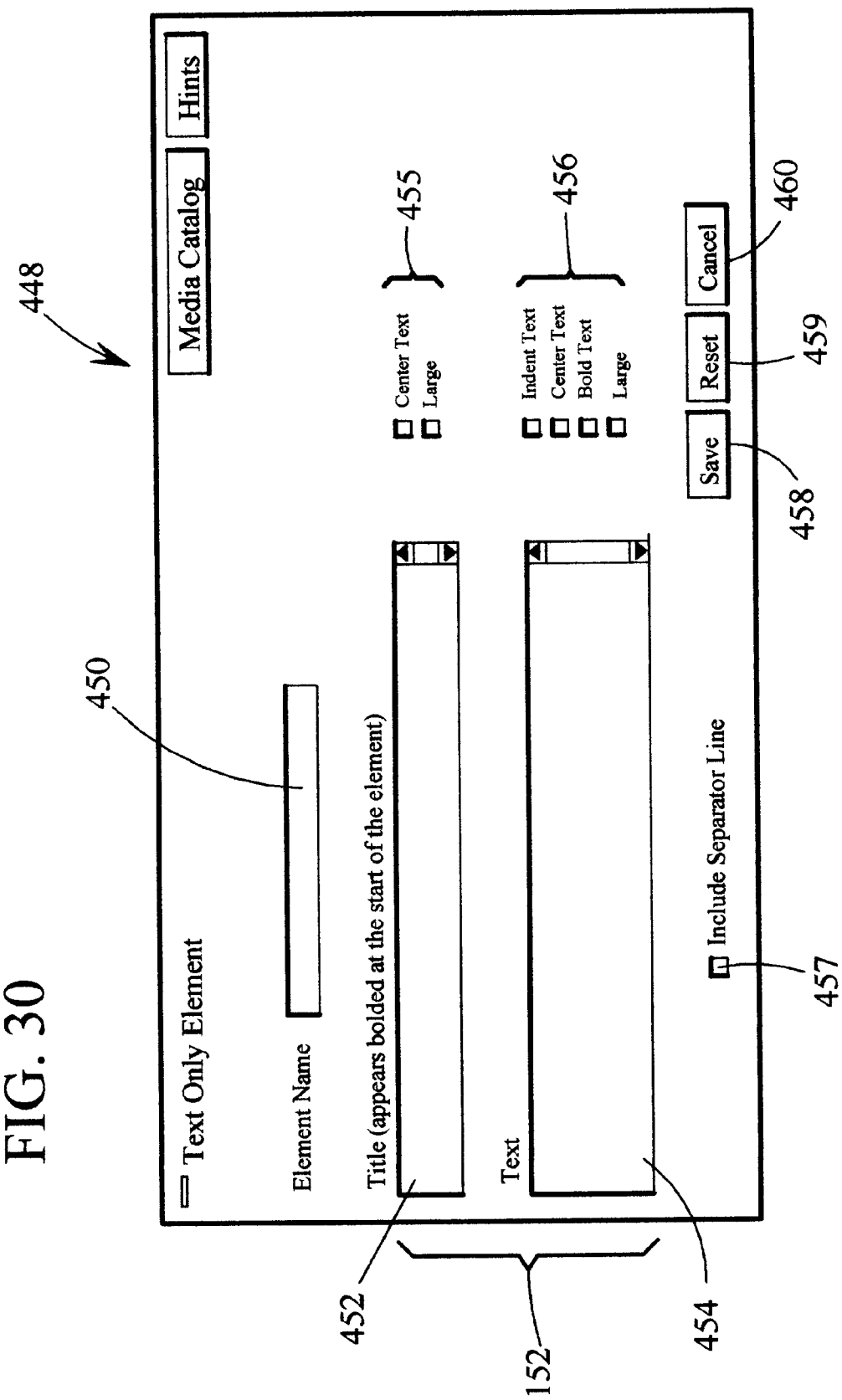
FIG. 30 illustrates the Text Only Lesson Element Template Page for incorporating textual lesson material into a lesson, and which can be accessed from the Lesson Element Template Page of FIG. 29.

The Text Only Lesson Element Template Page 448 of FIG. 30 includes several entry fields, including an element name description entry field 450 (for reference only, does not appear in the lesson); an element title reference field 452 (preferably appears bolded at the start of the element); and a student activity text entry field 454. The entries in the above fields correspond to the lesson element 152 shown in FIG. 5 illustrating the space lesson. Entries to the text field can be made directly, or cut and pasted from another application program, such as a word processing program, and/or from the media catalog, other lesson, or Internet sources in the manner described in the above discussion of the media catalog. Also included in the Text Only Lesson Element Template Page 448 are check boxes for selecting font size and positioning of text, and for including a separator line after the text. Clicking on the "save" button 458 saves the element and returns the teacher to the Lesson Development Page 420 in FIG. 28. The lesson element created using the Text Only Lesson Element Template Page is added to the lesson element list 456. Clicking on the "reset" button 459 clears the entry fields 450–454, and clicking on the "cancel" button 460 returns the teacher to the Lesson Development Page 420 without adding any elements to the lesson.

Figure 31:
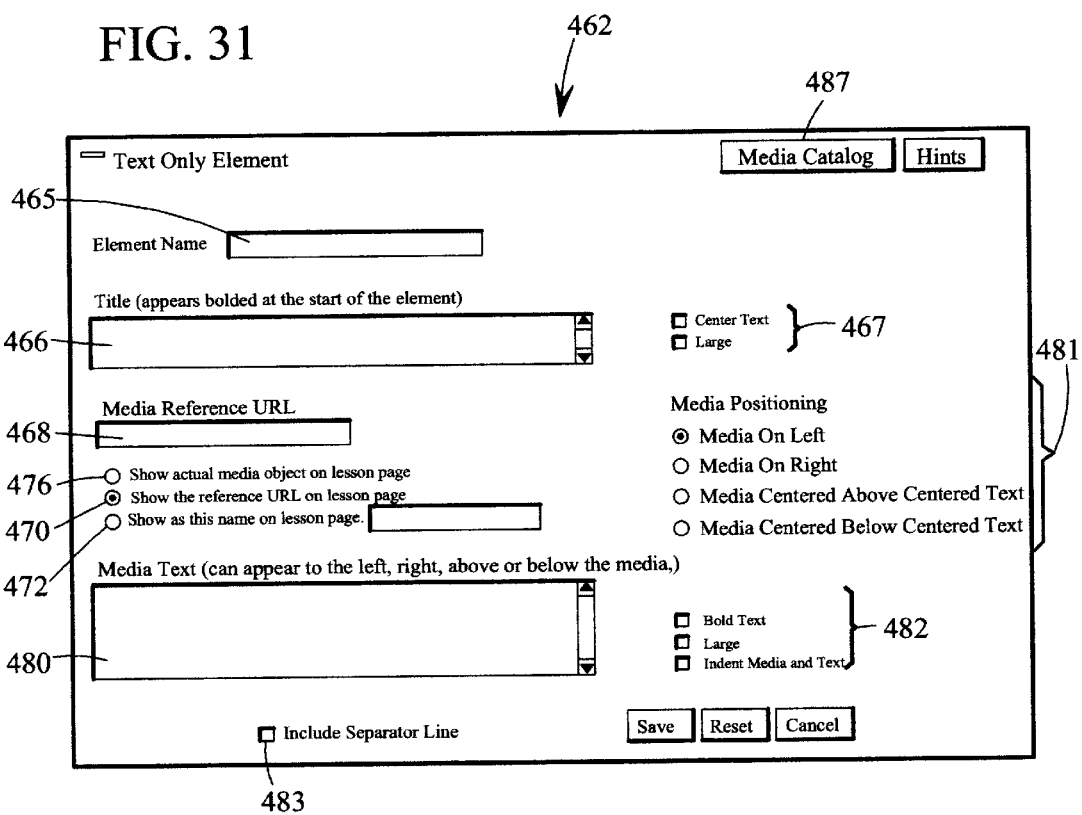
FIG. 31 shows the Other Media and Text Lesson Element Template Page for incorporating textual and other media lesson material into a lesson, and which can be accessed from the Lesson Element Template Page of FIG. 29.

Returning to FIG. 29 and the Lesson Element Template Page 440, selecting the "Media and Text Element" Template 444 displays the Media and Text Lesson Element Template Page 462 shown in FIG. 31. The Media and Text Template 462 includes an entry field 465 for a description or name of the lesson element (for reference only, it does not appear in the lesson); an entry field 466 for the title of the lesson element (preferably appears bolded at the start of the element), and check boxes 467 for selecting large font and centering. These items are similar to those of the Text Only Lesson Element Template 448 and are not further described. The template 462 also includes an entry field 468 for the media reference URL (e.g., image, audio, link, etc.). The reference can be a local reference to lesson material stored in the media folder on the server computer 20 or can be an Internet reference.

Several options are provided on the template page 462 for incorporating other media lesson material into a lesson, and which determine how the other media material will appear to, and will be accessed by the student during delivery of the lesson.

To show the reference URL on the lesson page of the lesson as a hot link to the item, the teacher can click on the first "radio" button 470. For an example, the student must click on the hot link to see the image. The teacher can click on the second "radio" button 472 to display the reference in the lesson, but with a different name. For example, the link "http://www.nasa.gov" can be displayed as "NASA Home Page". The alternative name "NASA Home Page" is entered into entry field 474. The teacher can click the third "radio" button 476 to display the actual media lesson material to the student rather than a link. For example, an image will display as the image rather than a link that the student clicks on to see the image. "Media Positioning" buttons 481 allow the user to position the other media to the "left", "right", "above" or "below" the related text media.

The lesson element text entered into the field 480 is displayed to the student in accordance with the selected "Media Positioning" button 481, and check boxes 482 are provided to select large font and bolding of the text. A check box 483 is selected to insert a separator line after the lesson element.

If the teacher knows the URL (i.e., the media reference, or link), it can be directly typed into the entry field 468. Alternatively, the URL can be pasted in, such as from the media catalog. For example, clicking on the "media catalog" button 487 accesses the media catalog. The media reference of interest can be located and its reference copied. The teacher can then quit the media catalog and return to the other media and text element page 462 and paste the reference in the field 468. The "save", "reset" and "cancel" buttons in FIG. 31 function as expected.

With reference again to FIG. 29, clicking the header, media and text, and footer template 446 of the Lesson Element Template Page 440 displays a header, other media and text and footer template page. This template, which is similar to the Other Media & Text Template 462 (FIG. 31), simply includes additional entry fields for header and footer elements (not shown), and controls for the appearance of these elements, and hence is not shown in a separate figure.

Figure 32:
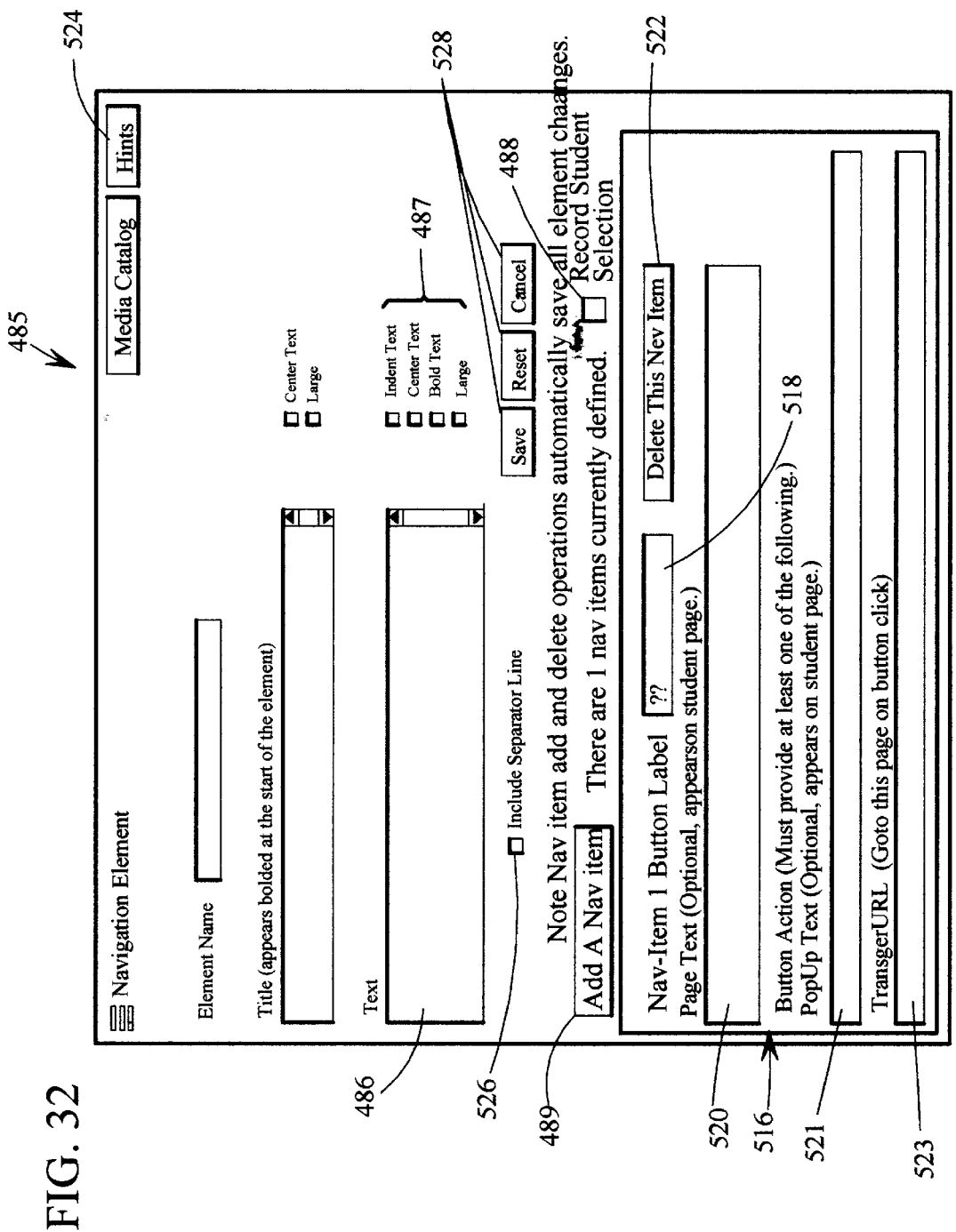
FIG. 32 shows the Navigation Element template page for incorporating a student navigation element into a lesson, and which can be accessed from the Lesson Element Template Page of FIG. 29.

Selection of the "Student Navigation" template 447 of FIG. 29 displays a Student Navigation Element template page 485, shown typically in FIG. 32. A typical navigational element provides the student with selections or choices, preferably through a plurality of buttons, which upon selection may display pop-up text or may transfer the student to one or more specified URLs. In the currently-preferred embodiment of the invention, up to ten buttons can be created per Navigation Element. However, as will be recognized by those skilled in the pertinent art based on the teachings herein, a different number of buttons (or selections) may be provided depending upon any of a plurality of different design considerations of the educational system.

Accordingly, in one embodiment of the invention, the Navigation Element allows the teacher to provide text defining one or more student tasks, followed by "navigation items" in the form of buttons, each of which may be accompanied by additional descriptive or instructional text defining actions to be taken by the student upon selecting the respective button. The Navigation Element also preferably allows the teacher to record the actions taken by each student as he or she progresses through the selections provided to, in turn, allow the teacher to later review the manner in which the student utilized the navigation buttons. For example, the navigation tracking data is preferably recorded in a student or class-specific database, and the teacher(s) may access the information of the database to, in turn, assess student comprehension and performance in carrying out the assignment(s) of the lesson and for generating reports based on the recorded tracking data.

Like the other lesson element template pages, the Student Navigation Element template page 485 of FIG. 32 comprises "Element Name" and "Title" fields, and check boxes for centering and enlarging the text of the Title field. In addition, the Navigation Element template page 485 comprises a window 486 for inserting text to define the functions of the respective navigational buttons, and associated check boxes 487 for indenting, centering, bolding and/or enlarging the text within the window. The discussion text appears above (or adjacent to) the respective navigational buttons on the student lesson page, and defines the respective button and the expected student actions with respect to the buttons. A check box 488 labeled "Record Student Selection" is provided to record each student's actions or selections in response to each navigational item (e.g., to record the buttons (corresponding to URLs or other items) selected by each student in response to the text of the navigational item). An "Add A Nav-Item" button 489 is provided to add new navigational buttons and related text and/or URL information. As shown typically in FIG. 32, the screen display 485 indicates adjacent to the "Add A Nav-Item" button 489 the number of nav-items currently defined for the respective element.

Upon selecting the "Add A Nav-Item" button 489, the user is presented with a fresh display for creating the new navigational item. A "Button Label" window 518 is provided to enter text indicative of the expected student action upon selecting the respective button. A "Page Text" window 520 is provided to enter text that will appear adjacent to the respective navigational button on the student page, and may include, for example, information further identifying the button or instructions for the students with respect to the button. A "Pop-Up Text" window 521 is provided to enter text that will appear in a separate dialog box on the student page upon selecting the button, and may include, for example, instructions for the student or further selections in response to the student's selection of the respective button. A "Transfer URL" button 523 permits entry of an Internet URL for automatically transferring the student to the designated URL in a separate browser window upon selecting the respective navigational button. As will be recognized by those skilled in the pertinent art based on the teachings herein, the Transfer URL can be a reference to any media type, such as an Internet website, a video file, text document, etc. When the Record Student Selection check box 488 is selected, the system 10 defines the Pop-Up Text 521 and/or Transfer URL 523 as the expected student actions upon selecting the respective navigational button. If after usage of the lesson neither of these items is populated, no student action is associated with the respective navigational button. Upon previewing the element, a message to this effect is displayed to the teacher. The teacher may, in turn, review the element to determine whether it is necessary, or whether the student actions need to be better or more concisely defined. A "Delete This Nav-Item" button 522 permits the user to delete the respective nav-item from the element.

Like the other lesson element pages, the Navigation Element template page 485 also includes a typical "Media Catalog" button 524 for accessing at any time the media catalog; a check box 526 for including a separator line; and "Save", "Reset" and "Cancel" buttons 528 for saving the element entries and exiting the respective element form, for clearing any new entries and restoring the original Name, Title, and Discussion Text to the element form, or for returning to the Student Lesson Development page without adding the element, respectively. In the currently-preferred embodiment of the invention, selecting the "Add A Nav-Item" button 489 or the "Delete This Nav-Item" button 522 automatically saves the element.

In FIG. 33 a typical navigation element display 530 includes at the top of the display a title, "Additional Research"; discussion text 486; three navigation buttons 532, 534 and 536 bearing button labels "Topic 1", "Topic 2", and "Topic 3", respectively; and page text 520 further describing or clarifying the label of each button.

As elements are added to the lesson, a current element list 436 shown typically in FIG. 34 is created, updated and displayed on the Student Lesson Development page of FIG. 28. As shown in FIG. 34, the list includes columns for the "Seq" (the sequence number of the element within the lesson) 490, "Type" 492 (e.g., text, text and media, etc.), and a "Description" 494 of each lesson element. Each element may be modified by clicking on the appropriate "modify" button 496 associated with the desired lesson to access the corresponding element page, or deleted by clicking on the appropriate "delete" button 498. The element will be deleted after confirmation. A "Change Type" ("Chg. Type") button 538 is provided adjacent to each element in order to change the type (i.e., template style) of the respective element, and a "Preview" button 540 is provided adjacent to each element in order to preview each element, one at a time. A "Page Attributes" button 542 is provided to access a list of standard images and colors that the teacher may select as background for the associated student page(s).

The lesson elements can be reordered by clicking on the "reorder elements" button 430 (FIG. 28), which displays the Reorder Lesson Elements Page 500 shown in FIG. 35. Moving the cursor to the "select new positions" column 502 and clicking on the current number of an element displays a pull-down menu listing the total number of positions in the current element list. Clicking on the respective Select New Positions button 502 enables the user to assign a new position to the element within the lesson plan, and clicking on the "reorder elements" button 504 reorders the elements in accordance with the selected positions. The "done" button 506 allows the exiting of the reorder page 500 without performing any reordering.

Returning to FIG. 27, the student lesson then can be previewed by clicking on the "preview lesson" button 428. When all lesson components and elements have been added, ordered in a desired sequence, the lesson previewed, and any desired modifications completed, clicking on the "create lesson" button 426 generates the Student Lesson that is served to the student as at least one page during lesson delivery. After the student lesson page is created, the teacher may (i) select the "Lesson Plan" button 433 to return to the Lesson Plan page, (ii) return to the teacher home page, or (iii) perform element edit operations, such as Modify, Delete, Change Type, Reorder, and Page Attributes. If any such element operations are performed, the student lesson page(s) must be re-created by clicking on the create lesson button 426.

With reference again to FIGS. 23A and 23B, "unpublished" lessons may be modified and copied, and "published" lessons may be copied only. First, the selected lesson is found by searching as indicated above in the discussion of FIGS. 20 and 21 showing the lesson builder lesson select form 340 and the lesson Search Results Page 351A. Clicking one of the "select" buttons 360 on the lesson Search Results Page 351A in FIG. 21 selects the respective lesson for modification or copying, and presents the user with either an unpublished page 370A of FIG. 23A, or a published page 370B of FIG. 23B. Preferably, as described above, a lesson can be modified only if the teacher who created the lesson has enabled the lesson for modification, such as by the teacher having checked the aforementioned modification check box 392 and entered a password in the password entry field 394 of the Lesson Builder Form Page 380 shown in FIG. 24. If the lesson can be modified and a password is required, clicking the "modify" button 372 of the page 370 prompts the teacher with a dialog password entry box, and upon entry of the correct password, the user is presented with the lesson builder component maintenance page 401 of FIG. 25. The teacher can now proceed to modify the lesson in a manner similar to the creation of a lesson described above in conjunction with FIGS. 25–35.

Lessons can also be copied. For example, if the lesson cannot be modified, the teacher can copy the lesson and modify the copy. Clicking on the "copy" button 374 of either page 370A of FIG. 23 or page 370B of FIG. 23B copies the lesson. The copied lesson will now appear in the list 352 of the search results list page 351A when appropriate search terms are entered in the search fields 342–350. The copied lesson appears on the list 352 with "Copy of" inserted in the title. For example, if the title of the lesson to be copied is "Astronomy 101", the copied lesson will have the title "Copy of Astronomy 101." The copied lesson can then be modified accordingly.

The controls supported by the pages presented by the lesson builder module 74 are summarized in the table below.

TABLE III

Lesson Builder Controls

| Control | Description |
| --- | --- |
| New Lesson | Allows the creation of a new lesson and displays the general lesson information form. |
| Continue | Provides access to lesson maintenance pages to enter lesson components. |
| Cancel | Returns to the Lesson Selection page. |
| Create Search | Searches using the search parameters specified to locate the desired lesson entries. Search results will be shown in the lower window. |
| Reset | Clears the form fields. |
| Preview Page | Displays the Student Activity Page associated with the Lesson. |
| Select | Selects the desired lesson far copying, modifying, or deleting. |
| Copy | Generates a copy of the selected lesson. |
| Modify | Enables modification of individual lesson component entries. |
| Delete | Allows the deletion of the lesson entry currently being displayed. |
| Show Lesson Plan | Displays all details relating to the lesson plan, including all notes and general information. |
| Add Element | Allows selection of an element template for a new lesson element. |
| Create Page | Provides for the creation of the student lesson pages, and returns to the Lesson Development Page. |
| Done | Sets all changes made and returns the user to the student development page. |
| Change Type | Allows the user to change the template style for a particular element. |
| Reorder Elements | Allows changing the order of the lesson elements. |
| Help | Provides the user with page specific help. This will also allow the user to access a more complete help and tutorial support capability. |
| Page Attributes | Provides for the selection of background appearance and annotation text for the student lesson page. |
| Publish This Lesson | Publishes the lesson, making it available for others to use. This control also "write-protects" the lesson so that it cannot be modified or deleted by unauthorized users. |
| Select A Back-Ground | Allows a user to select a background image or color for the student page. |
| Save Annotation Options | Saves optional annotation text for display at the bottom (or other designated position) on the student lesson page. |
| Tutorial | Provides access to a tutorial that explains all steps involved in building lessons. |
| Quit | Terminates the user's activities and returns to the Logon Page. |
| FAQ | Provides answers to frequently asked questions. |

As is understood by one of ordinary skill in the art, based on the disclosure herein, the above table of controls is exemplary, and not all the controls need be included in the lesson builder module 74 to create lessons for delivery to a student, or if desired, additional or alternative controls may be added.

The lesson delivery management module 78 of FIG. 1 delivers the lesson to a student. The presentation of a typical lesson is shown in FIGS. 5–8. The provision to the student of collaboration tools, such as MS NetMeeting™, is also considered within the scope of the present invention. For example, using MS NetMeeting™, the essay assigned to students at the end of the space lesson illustrated in FIGS. 5–8 can be a joint assignment that is to be worked on by multiple students and a teacher, each at a separate client computer. Each can view a video of the others while some or all edit and compose the essay. As understood by one of ordinary skill in the art, other collaboration software is also available and is suitable for use as part of the present invention. Such software includes Classpoint™ available from White Pine and CUSeeMe™, developed by Cornell University.

Traditionally, schools are organized into classes, with selected students and teachers associated with a given class. Accordingly, the present invention includes provision for assigning students to classes, teachers to classes, and controlling the lessons to which particular students have access. With reference to FIG. 9, the Teacher Home Page 224 includes buttons 230 and 232 for lesson and class assignments, respectively. Via these buttons, the educational system of the present invention allows access to the functional controls detailed in the table shown in FIG. 36.

In addition, the present invention can include provision for further controlling the access of students to lessons, for controlling access not only on a class basis, but on an individual student basis. That is, not all students in a particular class need be assigned the same lesson; different students can be assigned different lessons. Such access control also may be applied to selected elements of a lesson as well as to whole lessons, such that a teacher can create lesson plans of arbitrary length, involving a lesson or lessons having many lesson elements, without being forced to grant access to the entire body of instructional material, i.e., all of the lesson elements, at the same time. Selected elements can be made available over a period of several classroom sessions, with the more advanced element(s) made available during later classroom session(s). Access can be controlled on an individual student basis such that, for example, more advanced students can be granted access to the more advanced lesson elements before those students who have not yet completed earlier or less advanced lesson elements.

The User Management capability of the computer-based educational system 10 provides for the identification and validation of users, and for the tracking of logon/logoff activity. In accordance with a currently-preferred embodiment of the invention, two databases are maintained to support this function, one for student users, and the other for non-student or staff users. The User Management capability allows a user to (i) search either of the user databases by name or user ID; (ii) modify user information (this function may be limited to specific data sets); (iii) delete users (this function is preferably limited to administrative users), and (iv) add users (this function likewise is preferably limited to administrative users).

Figure 27:
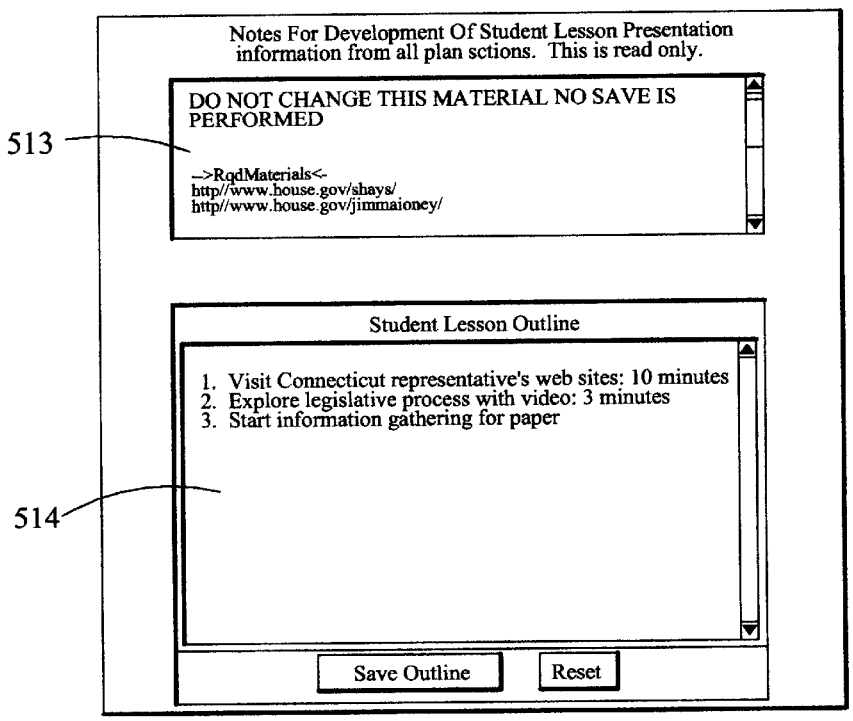
FIG. 27 shows the Student Lesson Outline Form for entry and display of an outline of the student lesson for use by a teacher user when creating a lesson, and which can be accessed by selecting the "Lesson Outline" button of the Lesson Plan Creation Page of FIG. 25.

In FIG. 27 a typical User Management screen for an administrative user (i.e., a user logged on and identified as a "system administrator") is identified by the reference numeral 544. The User Management screen 544 includes an "Add Student" button 546 for adding a "student" user to the system, and an "Add Staff" button 548 for adding a "staff" user to the system. Selecting the "Add Student" user button 546 presents an "Add Student User" form (not shown) requesting entry of information on the respective student for each of the fields of the student database (e.g., the fields may include user ID, password, student name, logon allowed? (i.e., whether the student is allowed access to the system), gender, grade, e-mail address, and "other" information). Similarly, selecting the "Add Staff" user button 548 presents an "Add Staff User" form (not shown) requesting entry of information on the respective staff user for each of the fields of the staff database (e.g., the same type of information as requested for the student users).

A system administrator may search the student database by selecting the "Student" database button 550, or may search the staff database by selecting the "Staff" database button 552. Once the database is selected, the user may specify the relevant known information for any of the user-specifiable fields 554 as shown (user ID, last name, first name, and/or middle initial), and may then select the "Search" button 556 to search the respective database based on the user-specified information. The system then displays a search results screen (not shown) which preferably displays the current information in each of the database fields for the respective user, and preferably also includes the most recent date and/or time the respective user logged on or off of the system. Also, the search results screen preferably includes "modify" and "delete" buttons associated with each user record in order to allow the system administrator to modify the information in any of the database fields, or to delete the user from the database. As described above, preferred functional controls accessed from the User Management page of FIG. 37 are illustrated in the table of FIG. 38.

It will thus be seen the invention efficiently obtains the objects set forth above. As understood by one of ordinary skill, programming is an art that allows many variations to achieve a given functionality. Programming approaches can vary. Sequences of processing steps, or the broad organization thereof, in a given program are only exemplary, and there can be variations in those steps that result in the same functionality of the overall system without departing from the spirit and scope of the invention. For example, known in the art are traditional structural programming and the more recent object-oriented approach, and those two approaches can result in a different organization of functional modules and data. Accordingly, it is intended that all matter contained in the above description and shown in the accompanying drawings be interpreted as illustrative and not in a limiting sense. It is considered that one of ordinary skill in the art, based on the disclosure herein, can implement the disclosed invention using techniques known to those of ordinary skill, and that those techniques can vary without departing from the spirit and scope of the invention.

It is also understood that the following claims are intended to cover generic and specific features of the invention described herein, and all statements of the scope of the invention which as a matter of language might be said to fall therebetween.

Having described the invention, what is claimed as new and to be secured by Letters Patent is:

1. A computer-based educational system for use by teacher and student users, comprising:
 a server computer and at least one client computer including, respectively, server and client processors for executing server and client programs; server and client memory elements each including a random access memory element for storing, respectively, said server and client programs; server and client input and output elements for communication between said server and client computers;
 at least one of said client and server computers including at least one display for providing output to a user and at least one user input device;
 said server computer further including:
  a lesson material database for storing lesson material, said lesson material including at least one of text, image, video, audio, and application program files;
  a lesson database for storing existing lessons, each of which includes predetermined lesson material incorporated into said existing lesson in a predetermined order;
  a lesson builder for allowing a teacher user to interactively create a new lesson via said at least one display and said at least one input device, said lesson builder including provision for allowing the teacher user to:
   search the lesson material database for said selected lesson material and to retrieve said selected lesson material when found;
   search the lesson database for said selected lesson material and to retrieve said selected lesson material when found; and
   incorporate said selected lesson material into said new lesson in a selected order;
  said computer-based educational system further including a lesson deliverer for interactively delivering said new lesson to a student user of said client computer via one of said at least one display and one of said at least one input device.

2. The computer-based educational system of claim 1, wherein said lesson deliverer includes a web page server for serving said lesson from said server computer as at least one page viewed by a browser application, and at least one of said server computer and said client computer include said browser application.

3. The computer-based educational system of claim 1, wherein said lesson builder further includes provision for allowing a teacher user to add lesson material to, and delete lesson material from, said lesson material database.

4. The computer-based educational system of claim 1, wherein said lesson builder further includes provision for allowing at least a teacher user to access the Internet to search for said selected lesson material, and for allowing incorporation of said selected lesson material into said lesson material database.

5. The computer-based educational system of claim 4, wherein incorporating said selected lesson material into said lesson material database includes one of (i) storing an Internet link to said material in said lesson material database, and (ii) storing said selected lesson material in said lesson material database.

6. The computer-based educational system of claim 1, wherein said lesson material database includes at least one folder for storing lesson material, and a media catalog including references to lesson material stored in said at least one folder, and wherein the provision to search said lesson material database includes provision to search said media catalog for said references.

7. The computer-based educational system of claim 1, wherein said lesson builder is served from said server computer as at least one web page for allowing the teacher user to access said lesson builder via a web browser, and one of said server computer and said client computer includes said web browser.

8. The computer-based educational system of claim 1, wherein said lesson builder further includes provision for previewing the lesson.

9. The computer-based educational system of claim 1, wherein said lesson builder further includes provision for allowing the teacher user to modify an existing lesson by at least one of (i) adding lesson material thereto, (ii) deleting lesson material therefrom, and (iii) changing the order of incorporation of said lesson material therein.

10. The computer-based educational system of claim 1, wherein said lesson builder further includes provision for accessing the Internet for searching for selected lesson material and for retrieving and incorporating said selected lesson material into said lesson as one of: (i) a link, for selection by a student user, to an Internet site that includes said selected lesson material, (ii) a link, for selection by a student user, to said selected lesson material stored on said server, and (iii) as lesson material to be directly presented to the student during delivery of the lesson.

11. The computer-based educational system of claim 1, wherein said lesson builder incorporates said lesson material into said lesson as lesson elements, providing at least one of: (i) a text lesson element template for creating a lesson element including text; and (ii) a text and other media lesson element template for creating a lesson element including text and other media, wherein other media includes at least one of image, audio, video, a link, and application program files.

12. The computer-based educational system of claim 11, wherein said lesson element templates allow the teacher to incorporate said lesson material into said lesson as a link, including a link to the Internet, such that said lesson material incorporated as said link is presented to the student at the student's option; and wherein delivery of said lesson by said lesson deliverer includes accessing the Internet to present said lesson material incorporated in said lesson as an Internet link.

13. The computer-based educational system of claim 11, herein said lesson element template allows the teacher to incorporate said lesson material from the Internet, and delivery of said lesson by said lesson deliverer includes accessing the Internet to present said lesson from the Internet to the student user.

14. The computer-based educational system of claim 1, wherein said lesson builder further includes provision for associating a lesson plan with a selected lesson, said lesson plan having at least one lesson plan component for presenting information regarding a lesson to a teacher user during at least one of creation and modification of a lesson.

15. The computer-based educational system of claim 14, wherein said lesson builder further includes provision for presenting a Student Lesson Outline Page including an entry field for entering text and for the display of said text during creation of said new lesson, said display also including the display of information from said lesson plan.

16. A computer-based educational system, comprising a server computer and at least one client computer including, respectively, server and client processors for executing server and client programs; server and client memory elements, each including a random access memory element for storing, respectively, said server and client programs; server and client input and output elements for communication between said server and client computers;
at least one of said server and client computers including at least one display means for providing output to a user and at least one user input means for receiving input from a user;
said server computer further including:
first means for storing lesson material including at least one of text, image, video, audio, and application program files;
second means for storing existing lessons including lesson material arranged for presentation in a predetermined order;
third means for allowing a teacher user to interactively create a new lesson via one of said at least one display means and said at least one user input means, said third means including:
means for searching the first means for selected lesson material and for retrieving said selected lesson material when found;
means for searching the second means and for selected lesson material and for retrieving said lesson material when found;
means for incorporating said selected lesson material into said new lesson; and
wherein said computer-based educational system further includes means for interactively delivering said lesson to the student user via one of said at least one display and input means.

17. The computer-based educational system of claim 16, including lesson web page means for delivering said lesson as at least one web page, and wherein said third means includes means for serving at least one other web page for allowing the teacher user to interactively access said third means, and at least one of said server and client computers includes at least one web browser for one of (i) delivery of said lesson and (ii) accessing said at least one other web page.

18. The computer-based educational system of claim 16, wherein said first means includes at least one folder means for storing lesson material, and media catalog means for including references to lesson material stored in said at least one folder means, and said means for searching said first means includes means for searching said media catalog means for said references.

19. The computer-based educational system of claim 16, wherein said third means includes means for accessing the Internet for searching and retrieving said selected lesson material.

20. The computer-based educational system of claim 16, wherein said client and server computers include collaboration program means for allowing users to collaborate during delivery of a lesson.

21. The computer-based educational system of claim 16, further including a second client computer including collaboration means such that a user of said second client computer can collaborate with other users during delivery of a lesson.

22. The computer-based educational system of claim 16, wherein said third means incorporates said lesson material into said lesson as lesson elements, providing at least one of: (i) a text lesson element template means for creating a lesson element including text; and (ii) a text and other media lesson element template means for creating a lesson element including text and other media, wherein other media includes at least one of image, audio, video, a link and application program files.

23. The computer-based educational system of claim 22 wherein said lesson element template means allows a teacher user to incorporate said lesson material into said lesson as a link, including a link to the Internet, such that said lesson material incorporated as said link is presented to the student at the student's option; and wherein delivery of said lesson by said lesson deliverer includes accessing the Internet to present said lesson material incorporated in said lesson as an Internet link.

24. The computer-based educational system of claim 16, including a lesson plan means having at least one lesson component for presenting information regarding a lesson to a user, and means for storing said lesson plan means including said at least one lesson plan component.

25. A computer-based educational system for use by teacher and student users, comprising:

a computer system having at least one processor for executing programs; a memory element including a random access memory element for storing programs; and input and output means, including means for accessing the Internet, said output means including at least one display and said input means including at least a keyboard and a pointing and selecting device, wherein said at least one display and said keyboard and pointing and selecting device allow a user to interactively use said educational system and the Internet for creating and executing lessons;

a database for locally storing lesson material, wherein lesson material includes at least one of text, image, video, audio, and application program files, said computer-based educational system allowing a teacher user to search for selected lesson material in said database and to add material thereto and delete material therefrom;

a lesson database for storing existing lessons, each of which presents to the student predetermined lesson material in a predetermined order, said educational system allowing a teacher user to add lessons to and delete lessons from said lesson database, and to search said lesson database for lessons including said selected lesson material;

a lesson builder for allowing a teacher user to interactively create a new lesson by incorporating lesson material including said selected lesson material in a selected order into a lesson; and a lesson deliverer for delivery of said new lesson to a student user for presentation of the lesson material incorporated in said new lesson.

26. The computer-based educational system of claim 25, wherein said lesson builder allows the teacher to incorporate said lesson material into said lesson as a link, including a link to the Internet; and wherein delivery of said lesson by said lesson deliverer includes accessing the Internet to present said lesson material incorporated in said lesson as an Internet link.

27. The computer-based educational system of claim 25, wherein said database includes at least one folder for including lesson material, and a media catalog for cataloging references to said lesson material, and wherein searching for said selected lesson material includes searching said media catalog.

28. The computer-based educational system of claim 27, wherein said references include references to the Internet.

29. The computer-based educational system of claim 25, wherein said lesson builder further includes a web server program and at least one web browser program for user interaction with said educational system such that said lesson is served as at least one web page and such that the teacher creates said lesson, including accessing said databases and incorporating lesson material into said new lesson via at least one other web page, and wherein said users may access the Internet during delivery and creation of a lesson.

30. The computer-based educational system of claim 25, wherein said lesson builder incorporates said lesson material into said lesson as lesson elements, providing at least one of a text lesson element template for creating a lesson element including text, and a text and media lesson element template for creating a lesson element including text and other media, wherein other media includes at least one of image, audio, video, a link, and application program files.

31. The computer-based educational system of claim 30, wherein said lesson builder allows a teacher user to reorder the lesson elements of a lesson.

32. The computer-based educational system of claim 25, wherein said lesson builder allows a teacher user to preview said student lesson during the process of creating said lesson.

33. The computer-based educational system of claim 25, wherein said educational system provides access to the Internet for searching for said selected material and for retrieving said selected material for incorporation into one of said database and said lesson database.

34. The computer-based educational system of claim 25, wherein said computer system includes a server computer and at least one client computer for presentation of said lesson served from said server computer, said client and server computers being capable of communication via one of the Internet and an intranet.

35. A computer-based educational method, comprising the steps of:

providing a server computer and at least one client computer, including, respectively, server and client processors for executing server and client programs; server and client memory elements, each including a random access memory element for storing, respectively, said server and client programs; server and client input and output elements for communication between said server and client computers, the step of providing a client computer including the step of providing a display for providing output to a user, and at least a keyboard and a pointing and selecting device;

providing a lesson material database for storing lesson material, said lesson material including at least one of text, image, video, audio, and application program files;

providing a lesson database for storing existing lessons, each of which includes predetermined lesson material incorporated into said existing lesson in a predetermined order;

providing a lesson builder for allowing a teacher user to interactively create a new lesson including selected lesson material and to modify an existing lesson, said lesson builder including provision for allowing the teacher user to:

search the lesson material database for said selected lesson material and retrieve said selected lesson material when found;

search the lesson database for said selected lesson material and retrieve said selected lesson material when found; and incorporate said selected lesson material into said new lesson; and providing a lesson deliverer for delivering said new lesson to a student.

36. An interactive educational method for use on a computer system having at least one user interface including at least one display and at least one input device for interaction with at least one user, wherein said at least one user includes at least one teacher and at least one student, comprising the steps of:

providing interactive access to at least one teacher to a lesson material database for searching for selected lesson material;

providing interactive access to the teacher to a lesson database for searching for said selected lesson material;

providing interactive access to the teacher to the Internet for searching for said selected lesson material;

providing interactive access to the teacher to a lesson builder for incorporating said selected lesson material into a new lesson in a selected order; and providing interactive access to a lesson deliverer for interactively delivering said new lesson to the at least one student.

* * * * *